(12) United States Patent
Krumm et al.

(10) Patent No.: US 12,530,495 B2
(45) Date of Patent: Jan. 20, 2026

(54) UTILIZING MACHINE-LEARNING MODELS TO DETECT LEAKING SENSITIVE BROWSING INFORMATION

(71) Applicant: Microsoft Technology Licensing, LLC, Redmond, WA (US)

(72) Inventors: John Charles Krumm, Redmond, WA (US); Kyle Robert Crichton, Brooklyn, NY (US); Siddharth Suri, Redmond, WA (US); Semiha Ece Kamar Eden, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 260 days.

(21) Appl. No.: 18/183,033

(22) Filed: Mar. 13, 2023

(65) Prior Publication Data
US 2024/0311510 A1    Sep. 19, 2024

(51) Int. Cl.
*G06F 21/62* (2013.01)
(52) U.S. Cl.
CPC .............................. *G06F 21/6254* (2013.01)
(58) Field of Classification Search
CPC ............ G06F 21/6245; G06F 21/6254; G06N 20/00
See application file for complete search history.

(56) References Cited

U.S. PATENT DOCUMENTS

| | | | |
|---|---|---|---|
| 10,229,370 B1 * | 3/2019 | Merritt | G06N 20/20 |
| 11,176,268 B1 * | 11/2021 | Kats | H04L 63/102 |
| 12,175,001 B2 * | 12/2024 | Ng | G06N 5/04 |
| 2020/0034917 A1 | 1/2020 | Wen | |
| 2021/0232706 A1 * | 7/2021 | Peruski | G06N 20/00 |
| 2022/0019868 A1 | 1/2022 | Klein | |
| 2023/0259979 A1 * | 8/2023 | Mejia | G06Q 30/0269 705/14.51 |

(Continued)

FOREIGN PATENT DOCUMENTS

CN         115545172 A      12/2022

OTHER PUBLICATIONS

Halimi, et al., "Real-time privacy risk quantification in online social networks." In Proceedings of the 2021 IEEE/ACM International Conference on Advances in Social Networks Analysis and Mining, pp. 74-81.

(Continued)

*Primary Examiner* — Olugbenga O Idowu
(74) *Attorney, Agent, or Firm* — Ray Quinney & Nebeker P.C.; Christopher K. Hallstrom

(57) ABSTRACT

The disclosure relates to a sensitivity detection system that accurately and efficiently determines when information based on a user's browsing activity unintentionally reveals private or other sensitive information about the user. For example, the sensitivity detection system generates and utilizes machine learning models for detecting sensitivity to accurately detect when sensitive user information is being leaked from a collection of user information, such as a user profile. Additionally, upon determining that sensitive user information is being revealed, in many instances, the sensitivity detection system performs mitigation actions to stop and/or reduce sensitive user information from being undesirably revealed.

20 Claims, 10 Drawing Sheets

(56) References Cited

U.S. PATENT DOCUMENTS

2023/0367855 A1* 11/2023 Garcia-Arellano ...... G06N 3/08

OTHER PUBLICATIONS

International Search Report and Written Opinion received for PCT Application No. PCT/US2024/018456, Jun. 10, 2024, 14 pages.
Sharad, et al., "An automated social graph de-anonymization technique," In Proceedings of the 13th Workshop on Privacy in the Electronic Society, Aug. 7, 2014, 12pages.
Hannak, et al., "Measuring Price Discrimination and Steering on E-commerce Web Sites", In Proceedings of the conference on internet measurement conference, Nov. 5, 2014, pp. 305-318.
Horn, Isabelleg. , "Dobbs v. Jackson W. Jackson Women's Health or s Health Organization 142 S. Ct. 2228", In Journal of Ohio Northern University Law Review, vol. 49, Issue 1, Jun. 24, 2022, 19 Pages.
Hu, et al., "Multi-country Study of Third Party Trackers from Real Browser Histories", In IEEE European Symposium on Security and Privacy, Sep. 7, 2020, pp. 70-86.
Hu, et al., "What a Tangled Web We Weave: Understanding the Interconnectedness of the Third Party Cookie Ecosystem", In ACM Conference on Web Science, Jul. 6, 2020, pp. 76-85.
Iordanou, et al., "Who's Tracking Sensitive Domains?", In Repository of arXiv:1908.02261v1, Aug. 6, 2019, 15 Pages.
Jang, et al., "An Empirical Study Of Privacy-Violating Information Flows In Javascript Web Applications", In Proceedings of the 17th ACM conference on Computer and communications security, Oct. 4, 2010, 14 Pages.
Joh, Elizabethe. , "Dobbs Online: Digital Rights as Abortion Rights", Retrieved From: https://papers.ssrn.com/sol3/papers.cfm?abstract_id=4210754, Sep. 5, 2022, 9 Pages.
Krishnamurthy, et al., "Privacy Diffusion On The Web: A Longitudinal Perspective", In Proceedings of the international conference on World wide web, Apr. 20, 2009, 10 Pages.
Lambrecht, et al., "Algorithmic Bias? An Empirical Study of Apparent Gender-Based Discrimination in the Display of STEM Career Ads", In Journal of Management Science, vol. 65, Issue 7, Apr. 10, 2019, 41 Pages.
Laperdrix, et al., "Beauty And The Beast: Diverting Modern Web Browsers To Build Unique Browser Fingerprints", In Proceedings of IEEE Symposium on Security and Privacy, May 22, 2016, pp. 878-894.
Lecuyer, et al., "Sunlight: Fine-grained Targeting Detection at Scale with Statistical Confidence", In Proceedings of the 22nd ACM SIGSAC conference on computer and communications security, Oct. 12, 2015, pp. 554-566.
Leon, et al., "Privacy and Behavioral Advertising: Towards Meeting Users' Preferences", In Proceedings of Eleventh Symposium on Usable Privacy and Security, Jul. 22, 2015, 15 Pages.
Erner, et al., "Internet Jones and the Raiders of the Lost Trackers: An Archaeological Study of Web Tracking from 1996 to 2016", In Proceedings of 25th USENIX Security Symposium, Aug. 10, 2016, pp. 997-1013.
Libert, Timothy, "Exposing the Hidden Web: An Analysis of Third-Party HTTP Requests on One Million Websites", In Repository of arXiv:1511.00619v1, Nov. 2, 2015, 11 Pages.
Liu, et al., "Adreveal: Improving Transparency Into Online Targeted Advertising", In Proceedings of the Twelfth ACM Workshop on Hot Topics in Networks, Nov. 21, 2013, 7 Pages.
Ma, et al., "Privacy vulnerability of published anonymous mobility traces", In Proceedings of the sixteenth annual international conference on Mobile computing and networking, Sep. 20, 2010, pp. 185-196.
Ma, et al., "Score Look-Alike Audiences", In Proceedings of IEEE 16th International Conference on Data Mining Workshops, Dec. 12, 2016, pp. 647-654.
Maris, et al., "Tracking Sex: The Implications Of Widespread Sexual Data Leakage And Tracking On Porn Websites", In Journal of New Media & Society, vol. 22, Issue 11, Nov. 2020, pp. 2018-2038.
Mcdonald, et al., "A Survey of the Use of Adobe Flash Local Shared Objects to Respawn HTTP Cookies", Retrieved From: https://kilthub.cmu.edu/articles/journal_contribution/A_Survey_of_the_Use_of_Adobe_Flash_Local_Shared_Objects_to_Respawn_HTTP_Cookies_CMU-CyLab-11-001_/6467741, Jan. 31, 2011, 26 Pages.
Mcdonald, et al., "Americans' Attitudes About Internet Behavioral Advertising Practices", In Proceedings of the 9th annual ACM workshop on Privacy in the electronic society, Oct. 4, 2010, 11 Pages.
Melicher, et al., "(Do Not) Track Me Sometimes: Users' Contextual Preferences for Web Tracking", In Proceedings on Privacy Enhancing Technologies, Aug. 2015, pp. 135-154.
Mikians, et al., "Detecting Price and Search Discrimination on the Internet", In Proceedings of the 11th ACM workshop on hot topics in networks, Oct. 29, 2012, 6 Pages.
Niforatos, et al., "Prevalence of Third-Party Data Tracking by US Hospital Websites", In Journal of JAMA Network Open, vol. 4, Issue 9, Sep. 22, 2021, 3 Pages.
Plane, et al., "Exploring User Perceptions of Discrimination in Online Targeted Advertising", In the Proceedings of the 26th USENIX Security Symposium, Aug. 16, 2017, pp. 935-951.
Rao, et al., "What do they know about me? Contents and Concerns of Online Behavioral Profiles", In Repository of arXiv:1506.01675v1, Jun. 4, 2015, 13 Pages.
Roesner, et al., "Detecting and Defending Against Third-Party Tracking on the Web", In Proceedings of the 9th USENIX Symposium on Networked Systems Design and Implementation, Apr. 25, 2012, 14 Pages.
Ruohonen, et al., "Invisible Pixels Are Dead, Long Live Invisible Pixels!", In Repository of arXiv:1808.07293v1, Aug. 22, 2018, 5 Pages.
Sabir, et al., "Analyzing the Impact and Accuracy of Facebook Activity on Facebook's Ad-Interest Inference Process", In Proceedings of the ACM on Human-Computer Interaction, vol. 6, Issue CSCW1, Apr. 7, 2022, 34 Pages.
Samarasinghe, et al., "Et tu, Brute? Privacy Analysis of Government Websites and Mobile Apps", In Proceedings of the ACM Web Conference, Apr. 25, 2022, 12 Pages.
Schelter, et al., "On the Ubiquity of Web Tracking: Insights from a Billion-Page Web Crawl", In Repository of arXiv:1607.07403v2 [cs.SI] Jul. 29, 2016, Jul. 29, 2016, 13 Pages.
Solomos, et al., "Clash of the Trackers: Measuring the Evolution of the Online Tracking Ecosystem", In Repository pf arXiv:1907.12860v1, Jul. 30, 2019, 13 Pages.
Soltani, et al., "Flash Cookies and Privacy", In Journal of SSRN Electronic, Aug. 10, 2009, 8 Pages.
Speicher, et al., "Potential for Discrimination in Online Targeted Advertising", In Proceedings of Machine Learning Research, Jan. 21, 2018, 15 Pages.
Sunstein, Cassr. , "Republic.Com", In Journal of Harvard Journal of Law & Technology vol. 14, Issue 2, Mar. 20, 2001, 14 Pages.
Sweeney, Latanya, "Discrimination in Online Ad Delivery: Google ads, black names and white names, racial discrimination, and click advertising", In Journal of Queue, vol. 11, Issue 3, Mar. 1, 2013, 19 Pages.
Terren, et al., "Echo Chambers on Social Media: A Systematic Review of the Literature", In Journal of Review of Communication Research, Mar. 15, 2021, pp. 99-118.
Tobin, et al., "Facebook Is Letting Job Advertisers Target Only Men", Retrieved From: https://www.propublica.org/article/facebook-is-letting-job-advertisers-target-only-men, Sep. 18, 2018, 22 Pages.
Ur, et al., "Smart, useful, scary, creepy: perceptions of online behavioral advertising", In Proceedings of the Eighth Symposium on Usable Privacy and Security, Jul. 11, 2012, 15 Pages.
Urban, et al., "Beyond the Front Page: Measuring Third Party Dynamics in the Field", In Proceedings of The Web Conference, Apr. 20, 2020, 13 Pages.

(56) References Cited

OTHER PUBLICATIONS

Vallina, et al., "Tales from the Porn: A Comprehensive Privacy Analysis of the Web Porn Ecosystem", In Proceedings of the Internet Measurement Conference, Oct. 21, 2019, 14 Pages.

Venkatadri, et al., "Auditing Offline Data Brokers via Facebook's Advertising Platform", In Proceedings of the World Wide Web Conference, May 13, 2019, pp. 1920-1930.

Venkatadri, et al., "On the potential for discrimination via composition", In Proceedings of the ACM Internet Measurement Conference, IMC, Oct. 2020, 12 Pages.

Vines, et al., "Exploring ADINT: Using Ad Targeting for Surveillance on a Budget—or—How Alice Can Buy Ads to Track Bob", In Proceedings of the 2017 on Workshop on Privacy in the Electronic Society, Oct. 30, 2017, pp. 153-164.

Wei, et al., "What Twitter Knows: Characterizing Ad Targeting Practices, User Perceptions, and Ad Explanations Through Users' Own Twitter Data", In the Proceedings of the 29th USENIX Security Symposium, Aug. 12, 2020, pp. 145-162.

Weinshel, et al., "Oh, the Places You've Been! User Reactions to Longitudinal Transparency About Third-Party Web Tracking and Inferencing", In Proceedings of the ACM SIGSAC Conference on Computer and Communications Security Nov. 2019, Nov. 6, 2019, pp. 149-166.

Wesselkamp, et al., "In-Depth Technical and Legal Analysis of Tracking on Health Related Websites with ERNIE Extension", In Proceedings of the 20th Workshop on Workshop on Privacy in the Electronic Society, Nov. 15, 2021, 17 Pages.

Wills, et al., "Understanding what they do with what they know", In Proceedings of the ACM workshop on Privacy in the electronic society, Oct. 15, 2012, 6 Pages.

Yamada, et al., "On Recruiting and Retaining Users for Security-Sensitive Longitudinal Measurement Panels", In Proceedings of Eighteenth Symposium on Usable Privacy and Security, Aug. 8, 2022, pp. 347-366.

Yang, et al., "A Comparative Measurement Study of Web Tracking on Mobile and Desktop Environments", In Proceedings on Privacy Enhancing Technologies, Apr. 1, 2022, pp. 24-44.

Yu, et al., "Got Sick and Tracked: Privacy Analysis of Hospital Websites", In Proceedings of the IEEE European Symposium on Security and Privacy Workshops, Jun. 6, 2022, pp. 278-286.

"Bringing Back PageRank Using Open Data", Retrieved From: https://www.domcop.com/openpagerank/, Retrieved on: Sep. 12, 2022, 1 Page.

"Civil Rights Act of 1964", Retrieved From: https://blowthetrumpet.org/documents/CivilRightsActLBJ_000.pdf, Jul. 2, 1964, 26 Pages.

"Digital Advertising In The United States—Statistics & Facts", Retrieved From: https://www.statista.com/topics/1176/online-advertising/#topicOverview, Jan. 20, 2023, 6 Pages.

"Explore what the world is searching", Retrieved From: https://web.archive.org/web/20191220193658/https://trends.google.com/trends/?geo=IN , Dec. 20, 2019, 4 Pages.

"Health Insurance Portability and Accountability Act of 1996 (HIPAA)", Retrieved From: https://www.cdc.gov/phlp/publications/topic/hipaa.html, Aug. 20, 1996, 3 Pages.

"National Statistics Domestic Violence Fact Sheet", Retrieved From: https://ncadv.org/statistics, Oct. 6, 2022, 9 Pages.

Daniels, et al. "Oklahoma Senate Bill 1503", Retrieved From: https://www.billtrack50.com/BillDetail/1431337, May 3, 2022, 1 Page.

"Oracle Audience Segmentation", Retrieved From: https://web.archive.org/web/20211122052928/https:/www.oracle.com/cx/marketing/audience-segmentation/, Nov. 22, 2021, 7 Pages.

"Regulation (EU) 2016/679 Of The European Parliament And Of The Council", Retrieved From: https://eur-lex.europa.eu/legal-content/EN/TXT/PDF/?uri=CELEX:32016R0679, May 4, 2016, 88 Pages.

"*Roe* v. *Wade*. 410 u.s. 113, 1973", Retrieved From: https://supreme.justia.com/cases/federal/us/410/113/, Jan. 22, 1973, 6 Pages.

"Texas Heartbeat Act", Retrieved From: https://en.wikipedia.org/wiki/Texas_Heartbeat_Act#:~:text=The%20Texas%20Heartbeat%20Act%2C%20Senate,about%20six%20weeks%20of%20pregnancy, Jan. 13, 2023, 27 Pages.

"The Age Discrimination in Employment Act of 1967", Retrieved From: https://www.eeoc.gov/statutes/age-discrimination-employment-act-1967, Jun. 12, 1968, 38 Pages.

"The Missing Api for Google Search", Retrieved From: https://www.serpwow.com/, Retrieved on: Sep. 12, 2022, 8 Pages.

"Top Websites Ranking", Retrieved From: https://web.archive.org/web/20220902172336/https://www.similarweb.com/top-websites/, Sep. 2, 2022, 5 Pages.

"Victims of Sexual Violence: Statistics", Retrieved From: https://web.archive.org/web/20230216144007/https://www.rainn.org/statistics/victims-sexual-violence, Feb. 16, 2023, 6 Pages.

Agarwal, et al., "Do Not Embarrass: Re-Examining User Concerns For Online Tracking And Advertising", In Proceedings of the Ninth Symposium on Usable Privacy and Security, Jul. 24, 2013, 16 Pages.

Agarwal, et al., "Stop tracking me Bro! Differential Tracking of User Demographics on Hyper-Partisan Websites", In Proceedings of The Web Conference, Jan. 10, 2020, pp. 1479-1490.

Ali, et al., "Discrimination through optimization: How Facebook's ad delivery can lead to skewed outcomes", In Repository of arXiv:1904.02095v1, Apr. 3, 2019, 15 Pages.

Ali, Omar, "Genetics of type 2 diabetes", In Journal of World journal of diabetes, vol. 4, Aug. 15, 2013, pp. 114-123.

Andreou, et al., "Investigating Ad Transparency Mechanisms in Social Media: A Case Study of Facebook's Explanations", In Proceedings of Network and Distributed Systems Security Symposium, Feb. 18, 2018, 15 Pages.

Andreou, et al., "Measuring the Facebook Advertising Ecosystem", In Publication of The Internet Society, Feb. 24, 2019, 16 Pages.

Angwin, et al., "Dozens of Companies Are Using Facebook to Exclude Older Workers From Job Ads", Retrieved From: https://www.propublica.org/article/facebook-ads-age-discrimination-targeting, Dec. 20, 2017, 9 Pages.

Angwin, et al., "Facebook Lets Advertisers Exclude Users by Race", Retrieved From: https://www.propublica.org/article/facebook-lets-advertisers-exclude-users-by-race, Oct. 28, 2016, 4 Pages.

Ayenson, et al., "Flash Cookies and Privacy II: Now with HTML5 and ETag Respawning", In Journal of SSRN, Jul. 30, 2011, 21 Pages.

Balebako, et al., "Measuring the Effectiveness of Privacy Tools for Limiting Behavioral Advertising", In Proceedings of Web 2.0 Workshop on Security and Privacy, May 24, 2012, 10 Pages.

Barford, et al., "Adscape: harvesting and analyzing online display ads", In Proceedings of the 23rd international conference on World wide web, Apr. 7, 2014, pp. 597-608.

Bashir, et al., "Diffusion of User Tracking Data in the Online Advertising Ecosystem", In Proceedings of Privacy Enhancing Technologies, Oct. 2018, pp. 85-103.

Bashir, et al., "Tracing Information Flows Between Ad Exchanges Using Retargeted Ads", In Proceedings of the25th USENIX Security Symposium, Aug. 10, 2016, pp. 481-496.

Binns, et al., "Measuring Third-Party Tracker Power Across Web And Mobile", In Journal of ACM Transactions on Internet Technology, vol. 18, Issue 4, Aug. 7, 2018, 22 Pages.

Boix, et al., "Hiding in the Crowd: an Analysis of the Effectiveness of Browser Fingerprinting at Large Scale", In Proceedings of the World Wide Web Conference, Apr. 23, 2018, pp. 309-318.

Cahn, et al., "An Empirical Study of Web Cookies", In Proceedings of the 25th International Conference on World Wide Web, Apr. 11, 2016, pp. 891-901.

Carrascosa, et al., "I Always Feel Like Somebody's Watching Me Measuring Online Behavioural Advertising", In Proceedings of the 11th ACM Conference on Emerging Networking Experiments and Technologies, Dec. 1, 2015, 13 Pages.

Cassel, et al., "OmniCrawl: Comprehensive Measurement of Web Tracking With Real Desktop and Mobile Browsers", In Proceedings on Privacy Enhancing Technologies, Jan. 2022, pp. 227-252.

(56) References Cited

OTHER PUBLICATIONS

Chiou, et al., "Fake News and Advertising on Social Media: A Study of the Anti-Vaccination Movement", In Journal of SSRN Electronic, Jul. 6, 2018, 35 Pages.

Cranor, et al., "User Perceptions of Sharing, Advertising, and Tracking", In Proceedings of Symposium on Usable Privacy and Security, Jul. 22, 2015, pp. 53-67.

Crichton, et al., "How Do Home Computer Users Browse the Web?", In Journal of ACM Transactions on the Web, vol. 16, Issue 1, Sep. 28, 2021, 27 Pages.

Datta, et al., "Automated Experiments On Ad Privacy Settings: A Tale Of Opacity, Choice, And Discrimination", In Repository of arXiv:1408.6491v1, Aug. 27, 2014, 16 Pages.

Degeling, et al., "Tracking and Tricking a Profiler: Automated Measuring and Influencing of Bluekai's Interest Profiling", In Proceedings of the 2018 Workshop on Privacy in the Electronic Society, Jan. 15, 2018, 13 Pages.

Eckersley, Peter, "How Unique Is Your Web Browser?", In Proceedings of 10th International Symposium Privacy Enhancing Technologies, Jul. 21, 2010, 19 Pages.

Englehardt, et al., "Cookies That Give You Away: The Surveillance Implications of Web Tracking", In Proceedings of the 24th International Conference on World Wide Web, May 18, 2015, pp. 289-299.

Englehardt, et al., "Online Tracking: A 1-million-site Measurement and Analysis", In Proceedings of ACM SIGSAC Conference on Computer and Communications Security, Oct. 24, 2016, pp. 1388-1401.

Feltner, et al., "High Price of Mandatory Auto Insurance in Predominantly African American Communities", Retrieved From: https://consumerfed.org/wp-content/uploads/2015/11/151118_insuranceinpredominantlyafricanamericancommunities_CFA.pdf, Nov. 2015, 16 Pages.

Freudiger, et al., "Evaluating the Privacy Risk of Location-Based Services", Retrieved From: https://icapeople.epfl.ch/rshokri/papers/11FC.pdf, Feb. 2012, 16 Pages.

Friedman, et al., "Prevalence of Third-Party Tracking on Abortion Clinic Web Pages", In Journal of JAMA Internal Medicine, vol. 182, Issue 11, Nov. 2022, pp. 1221-1222.

Gambs, et al., "De-Anonymization Attack on Geolocated Data", In Journal of Journal of Computer and System Sciences vol. 80, Issue 8, Dec. 2014, pp. 1597-1614.

Gervais, "Quantifying Web Adblocker Privacy", In Publication of Springer International Publishing, Sep. 2017, pp. 21-42.

Goel, et al., "Who Does What on the Web: A Large-Scale Study of Browsing Behavior", In Proceedings of the International AAAI Conference on Web and social media, Aug. 3, 2021, pp. 130-137.

Gomer, et al., "Network Analysis of Third Party Tracking: User Exposure to Tracking Cookies through Search", In Proceedings of IEEE/WIC/ACM International Joint Conferences on Web Intelligence and Intelligent Agent Technologies, Nov. 17, 2013, pp. 549-556.

Götze, et al., "Measuring Web Cookies in Governmental Websites", In Proceedings of 14th ACM Web Science Conference, Jun. 26, 2022, pp. 44-54.

Guha, et al., "Challenges in Measuring Online Advertising Systems", In Proceedings of the 10th ACM SIGCOMM conference on Internet measurement, Nov. 1, 2010, pp. 81-87.

Zang, et al., "Anonymization of Location Data Does Not Work: a Large-Scale Measurement Study", In Proceedings of the 17th Annual International Conference on Mobile Computing and Networking, Sep. 19, 2011, pp. 145-156.

Zang, Jinyan, "Solving the problem of racially discriminatory advertising on Facebook", Retrieved From: https://www.brookings.edu/research/solving-the-problem-of-racially-discriminatory-advertising-on-facebook/, Oct. 19, 2021, 15 Pages.

Zeber, et al., "The Representativeness of Automated Web Crawls as a Surrogate for Human Browsing", In Proceedings of The Web Conference 2020, Apr. 20, 2020, 13 Pages.

Martin, et al., "Hidden Surveillance By Web Sites: Web Bugs In Contemporary Use", In Journal of Communications of the ACM, vol. 46, Issue 12, Dec. 2003, pp. 258-264.

"India: Building Best Practices In Healthcare Services Globally", In Publication of FICCI and Ernst & Young LLP, Nov. 13, 2019, 56 Pages.

\* cited by examiner

UTILIZING MACHINE-LEARNING MODELS TO DETECT LEAKING SENSITIVE BROWSING INFORMATION

BACKGROUND

Recent years have seen significant hardware and software advancements in computing devices, particularly in the area of managing user information and digital content. For example, individuals using computing devices are increasingly provided with digital content when browsing online, including requested content as well as unsolicited content. In any case, individuals expect their privacy to be maintained, as those guarding sensitive information do not want their private or sensitive information to be leaked or unintentionally shared. Unfortunately, many existing systems that manage user information and provide digital content do not have accurate or flexible safeguards in place to determine when or how they are leaking sensitive user information. As a consequence, many existing systems generate and share user information that inadvertently leaks or otherwise reveals private or sensitive information about individuals.

BRIEF DESCRIPTION OF THE DRAWINGS

The detailed description provides one or more implementations with additional specificity and detail through the use of the accompanying drawings, as briefly described below.

DETAILED DESCRIPTION

Figure 1:
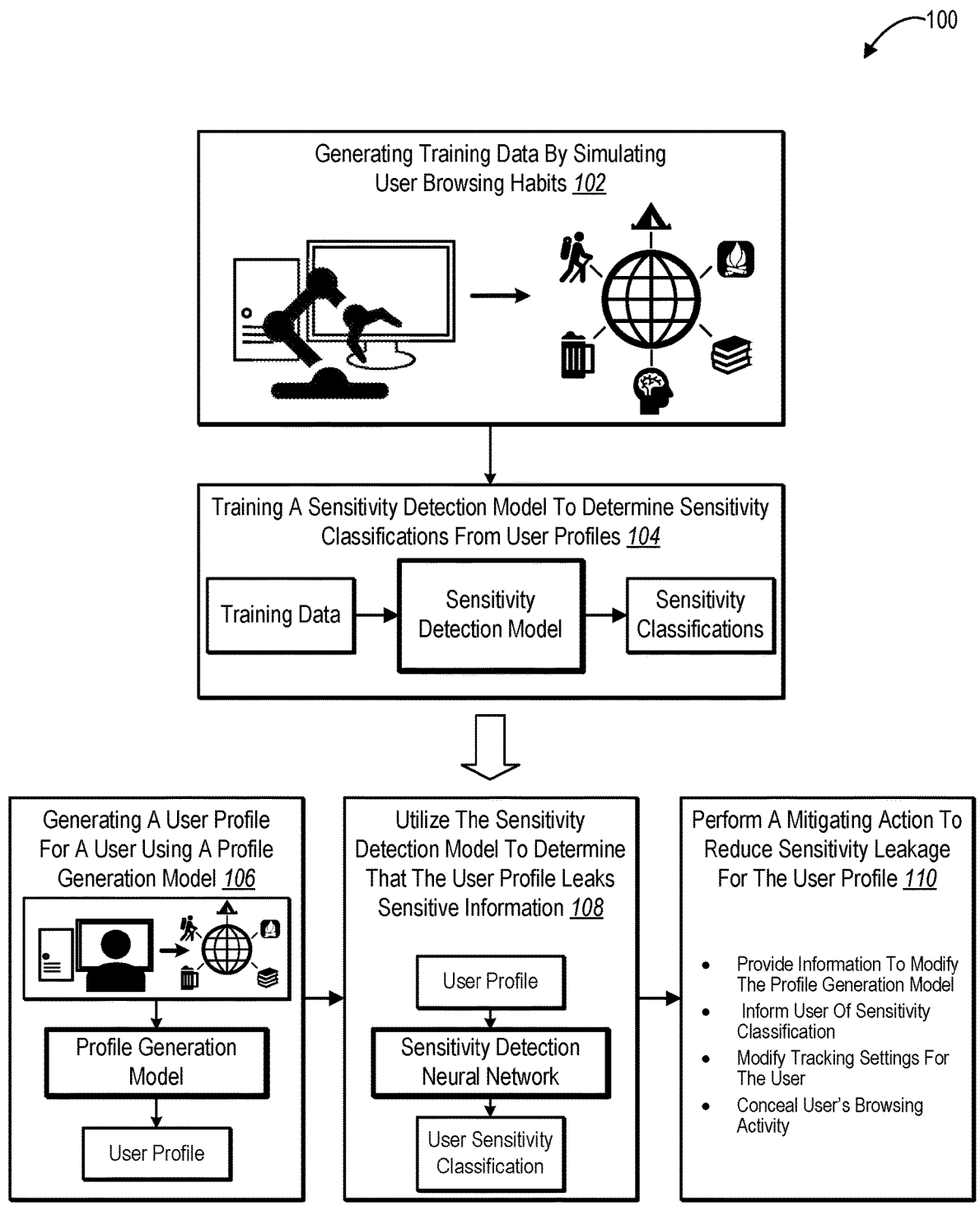
FIG. 1 illustrates an example overview for implementing a sensitivity detection system to detect and mitigate the leaking of sensitive user information in accordance with one or more implementations.

This disclosure describes a sensitivity detection system that accurately and efficiently determines when information based on a user's browsing activity unintentionally reveals private or other sensitive information about the user. For example, the sensitivity detection system generates and utilizes machine learning models for detecting sensitivity to accurately detect when sensitive user information is being leaked from a collection of user information, such as a user profile. Additionally, upon determining that sensitive user information is being revealed, in many instances, the sensitivity detection system performs mitigation actions to stop and/or reduce sensitive user information from being undesirably revealed.

By way of context, as users browse the web and perform other actions with online services, their user information is often recorded and subsequently shared. For example, web cookies, trackers, and browser fingerprints store and share user information with websites and web services. Additionally, this user information is used to generate user profiles, which often include a series of descriptive labels that indicate the characteristics and attributes of users. Further, websites and web services use user profiles to deliver digital content tailored to users.

In some cases, the digital content provided to users enhances user experiences by delivering content desired by users. However, in other cases, the digital content provided to a user is discriminatory or predatory. For example, a user is served digital content, such as an advertisement, that targets them based on race, gender, medical conditions, or other sensitive issues that the user wishes to remain private. In these cases, benign information from the user profile is unintentionally revealing sensitive information about the user.

Accordingly, this document describes a sensitivity detection system that utilizes machine-learning models to accurately detect when user information, such as a user profile, is unintentionally revealing private or other sensitive user information. Additionally, the sensitivity detection system provides mitigating actions and other tools to prevent inappropriate digital content from being provided to users ranging from remedies at the system level to remedies at the user level.

To illustrate, in various implementations, the sensitivity detection system identifies a user profile of a user that is generated by a profile generation model based on the browsing activity of the user. In addition, the sensitivity detection system provides the user profile to a sensitivity detection machine-learning model, which is trained to classify users to sensitivity classifications based on user profiles, to determine that the user profile is classified as a particular sensitive topic. Further, when a user profile is found to leak sensitive information, the sensitivity detection system provides mitigation actions, such as an indication to the profile generation model that causes the profile generation model to disassociate the given user profile from the particular sensitivity classification.

As mentioned above, implementations of the present disclosure solve one or more of the problems mentioned above as well as other problems in the art. Systems, computer-readable media, and methods utilize the sensitivity detection system to determine when user profiles of users include descriptive labels that inadvertently reveal private to sensitive information about users. Indeed, the sensitivity detection system trains and utilizes machine-learning models, such as a decision tree classification model, to determine when a user profile unintendedly associates users with sensitive topics. In some implementations, the sensitivity detection system also indicates one or more labels or label combinations from the user profile that influenced the sensitivity classification result.

As described herein, the sensitivity detection system provides several technical benefits in terms of computing accuracy and efficiency compared to existing computing systems. Indeed, the sensitivity detection system provides several practical applications that deliver benefits and solve problems associated with detecting data sources (e.g., reputable data aggregators) that unintendedly reveal sensitive user information as well as mitigating future information leaks.

To illustrate, the sensitivity detection system accurately determines when a user profile indicates or suggests sensitive user information. For instance, by training and utilizing a sensitivity detection machine-learning model, the sensitivity detection system accurately determines when a user profile is leaking sensitive information about a given user. In various implementations, the sensitivity detection system improves the accuracy of the sensitivity detection machine-learning model by intelligently crafting data to train and tune the machine-learning model. As further provided below, because sensitive-based user data is largely unavailable, the sensitivity detection system synthesizes uses data by generating an algorithm that accurately mimics the real-world behaviors of users without needlessly exposing users' privacy.

Additionally, by utilizing the sensitivity detection machine-learning model, the sensitivity detection system is able to determine when and/or how a profile generation model generates a user profile that leaks sensitive information. For example, in various implementations, the sensitivity detection system utilizes the sensitivity detection machine-learning model to identify the combination, characteristics, and/or order of descriptive labels included in a user profile of a user that could unintentionally reveal sensitive information about the user. In response, the sensitivity detection system provides indications to the profile generation model that cause the profile generation model to disassociate certain browser activity with a given combination of descriptive labels.

Further, the sensitivity detection system improves computing efficiency by correcting and/or preventing the leakage of sensitive user information. For instance, when a user profile leaks sensitive information, digital content providers provide unwanted and unnecessary digital content to users. This unwanted and unnecessary digital content wastes computer resources and network bandwidth across multiple computing devices. Accordingly, upon determining that a user profile potentially leaks sensitive information, the sensitivity detection system employs multiple actions to mitigate user profiles from leaking sensitive information and prevent computing resource waste. Indeed, as further described below, these mitigating actions range from changes to the profile generation model to indications and modifications on user client devices.

To illustrate, in one example, the sensitivity detection system facilitates data aggregators to generate better user profiles that safeguard sensitive user information from being revealed. In another example, the sensitivity detection system facilitates digital content providers to not serve digital content based on leaked sensitive user information. As an additional example, the sensitivity detection system provides countermeasures to offset user actions that would otherwise affect a user profile of a user with respect to revealing sensitive user information. Further, the sensitivity detection system assists users to change their browsing activity to better protect themselves against malicious actors.

As illustrated in the foregoing discussion, this disclosure utilizes a variety of terms to describe the features and advantages of one or more implementations described. To illustrate, this disclosure describes a sensitivity detection system in the context of a network. In this disclosure, a "network" is defined as one or more data links that enable the transport of electronic data between computer systems and/or modules and/or other electronic devices. A network may include public networks such as the Internet as well as private networks. When information is transferred or provided over a network or another communications connection (either hardwired, wireless, or a combination of hardwired or wireless) to a computer, the computer properly views the connection as a transmission medium. Transmission media can include a network and/or data links that can be used to carry needed program code means in the form of computer-executable instructions or data structures and which can be accessed by a general-purpose or special-purpose computer. Combinations of the above are also included within the scope of computer-readable media.

As an example, the term "user identifier" refers to an identifier of a user associated with one or more client devices. For ease of explanation, the term "user" refers to a user identifier of a user. For example, when a user performs an action that is being captured, a computing device detects the action and associates it with the user identifier of the user. In many implementations, the term "browsing activity of a user" (or "browsing activity" for short) refers to detected digital actions performed by the user with respect to websites and web services, where these actions are stored by the computing device in connection with the user's user identifier. Similarly, the term "sensitive browsing activity" represents a user browsing websites or using web services that are associated with a sensitive topic.

In various implementations, a profile generation model generates a user profile from the browsing activity associated with a user identifier. For example, the profile generation model generates a user profile by determining a set of descriptive labels to assign to the user identifier from a larger set of possible descriptive labels, where the descriptive labels are based on the browsing activity of the user. In some implementations, the user profile includes additional attributes, characteristics, and/or information about the user. In one or more implementations, the user profile is a user advertisement profile generated by an advertisement profile generation model.

In this disclosure, the terms "sensitive topics" and "sensitivity classifications" refer to topics, labels, or issues that a user desires to privately safeguard and not have revealed. For instance, sensitive topics are regarded as sensitive due to the potential for negative consequences, such as social stigma, discrimination, or violation of privacy. Examples of sensitive topics include medical conditions, political alignment, race, sexual orientation, personal finances, past trauma, emotionally impactful topics, and non-mainstream beliefs.

As an additional example, as used in this document, the term "machine-learning model" refers to a computer model or computer representation that can be tuned (e.g., trained) based on inputs to approximate unknown functions. For instance, a machine-learning model can include but is not limited to a decision tree (e.g., a gradient-boosted decision tree or a decision tree classification model), a transformer model, a sequence-to-sequence model, a neural network (e.g., a convolutional neural network or deep learning model), a regression-based model (e.g., quantile or linear), a random forest model, a clustering model, a support vector learning model, a Bayesian network model, a principal component analysis model, or a combination of the above. Additionally, a machine-learning model includes deep-learning models and/or shallow-learning models.

For example, the sensitivity detection system generates and utilizes a sensitivity detection machine-learning model that determines one or more sensitivity classifications (e.g., sensitivity topics) that are identifiable from a leaky user profile. In various implementations, the sensitivity detection machine-learning model is a decision tree model. In some implementations, the sensitivity detection machine-learning model outputs a decision path for classifying a user profile to a particular sensitivity classification and/or the combination of descriptive labels in the user profile that resulted in the particular sensitivity classification.

Additional details in connection with an example implementation of the sensitivity detection system are discussed in connection with the following figures. For example, FIG. 1 illustrates an example overview for implementing a sensitivity detection system to detect and begin mitigation of leaking sensitive user information in accordance with one or more implementations. As shown, FIG. 1 illustrates a series of acts 100 that, in many instances, is performed by a sensitivity detection system with respect to a cloud computing system.

To illustrate, the series of acts 100 includes an act 102 of generating training data by simulating a user's browsing habits. As mentioned above, to protect the privacy of users, the sensitivity detection system operates without needing to use actual user data. Instead, the sensitivity detection system simulates user browsing activities in a way that intelligently mimics user behavior. Additional details regarding the sensitivity detection system generating training data are provided below in connection with FIGS. 4A-4C.

As shown, the series of acts 100 includes an act 104 of training a sensitivity classification model to determine sensitivity classifications from user profiles. For example, in various implementations, the sensitivity detection machine-learning model trains a sensitivity detection model, such as a sensitivity detection machine-learning model and/or a sensitivity detection neural network, to point out any sensitivity classifications that the user profiles may be unintentionally signaling. In various implementations, the sensitivity detection system utilizes the generated training data to train and refine the sensitivity detection model. Additional details regarding training sensitivity detection machine-learning models are provided below in connection with FIG. 5A.

As also shown, the series of acts 100 includes an act 106 of generating a user profile for a user (a user identifier associated with a user) using a profile generation model. For example, the sensitivity detection system and/or another system utilizes a profile generation model to convert the browsing activities of a given user into a user profile using a profile generation model. Additional details regarding generating user profiles are provided below in connection with FIG. 3.

FIG. 1 also shows the series of acts 100 includes an act 108 of utilizing the sensitivity detection model to determine that the user profile leaks sensitive information. For example, using the sensitivity detection model, the sensitivity detection system determines that the user profile generated for the given user results in one or more sensitivity classifications. In other words, the user profile includes one or more combinations of benign labels that unintentionally reveal private or sensitive user information. Additional details regarding utilizing the sensitivity detection machine-learning model to determine sensitivity classifications from user profiles are provided below in connection with FIG. 5B.

Additionally, the series of acts 100 includes an act 110 of performing mitigating actions to reduce sensitivity leakage for the user profile. In particular, upon detecting that the user profile of the given user leaks sensitive information, the sensitivity detection system implements one or more mitigating actions to prevent future user profile leaks. As shown, in some implementations, the sensitivity detection system provides information to the profile generation model to patch the leak. In some instances, the sensitivity detection system informs users when their user profiles potentially reveal sensitive information.

Additionally, the sensitivity detection system may modify tracking settings for the user on their client devices. Further, in various cases, the sensitivity detection system conceals a user's browsing activity by injecting artificial counteracting browsing activities. Moreover, in some implementations, the sensitivity detection system informs digital content providers regarding sensitivity leaks to prevent digital content providers from inadvertently discriminating based on the revealed sensitive information. Additional details regarding the sensitivity detection system performing mitigating actions are provided below in connection with FIGS. 6A-6C.

Figure 2:
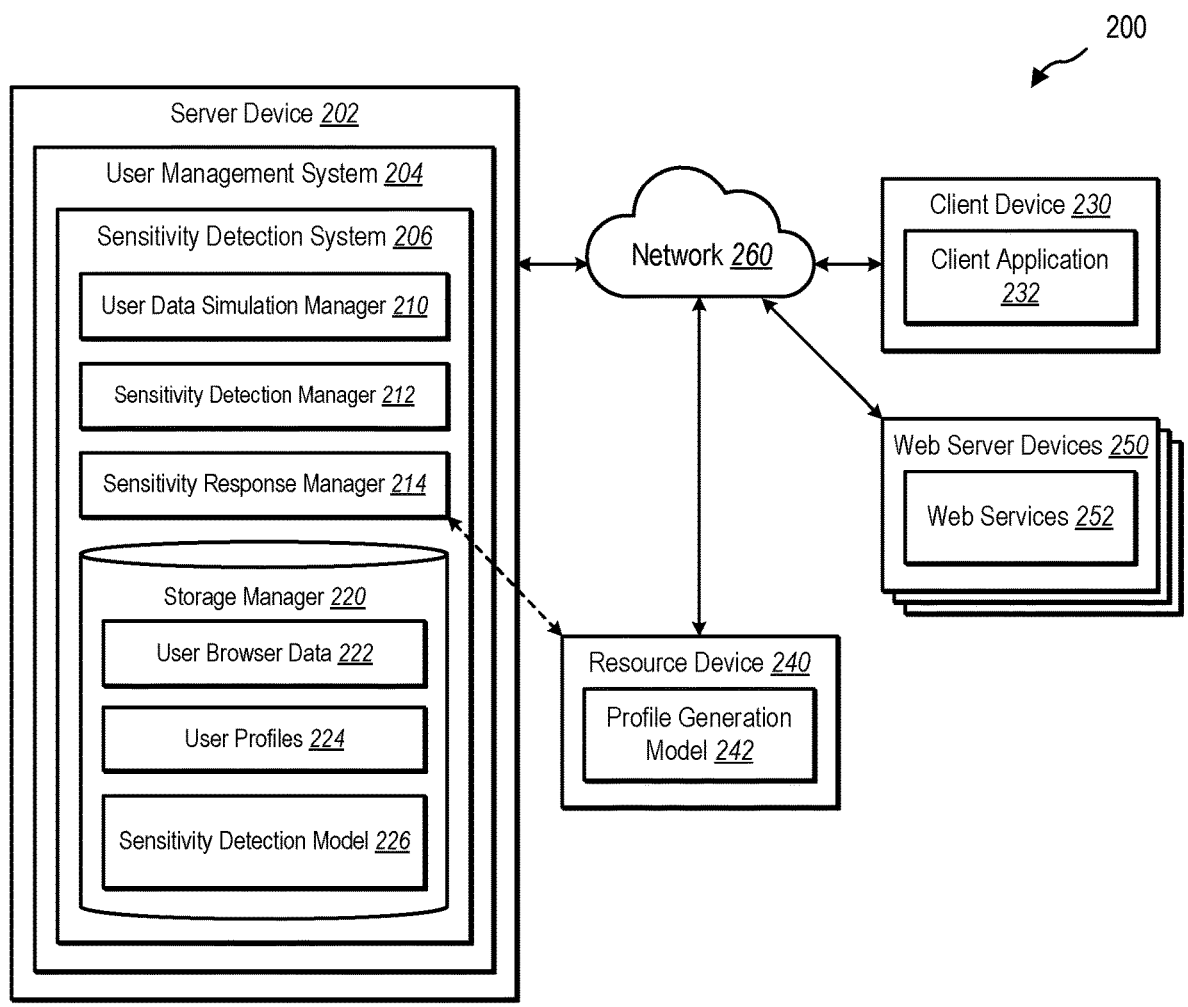
FIG. 2 illustrates an example computing system environment where a sensitivity detection system is implemented in accordance with one or more implementations.

With a general overview of the sensitivity detection system in place, additional details are provided regarding the components and elements of the sensitivity detection system. To illustrate, FIG. 2 provides an example diagram of the sensitivity detection system. In particular, FIG. 2 illustrates an example computing system environment where a sensitivity detection system is implemented in accordance with one or more implementations. While FIG. 2 shows an example arrangement and configuration within a computing system environment 200, other arrangements and configurations are possible.

As shown, FIG. 2 includes a server device 202, a client device 230, a resource device 240, and web server devices 250, which are each connected by a network 260. Additional details regarding these and other computing devices are provided below in connection with FIG. 8. In addition, FIG. 8 also provides additional details regarding networks, such as the network 260 shown.

The computing system environment 200 includes the server device 202 having a user management system 204. In various implementations, the user management system 204 manages user information including storing user information associated with user identifiers, providing communications and other digital content to the user, safeguarding user privacy, and/or performing other functions. As shown, the user management system 204 includes the sensitivity detection system 206. In some implementations, the sensitivity detection system 206 is located outside of the user management system 204.

As mentioned above, the sensitivity detection system 206 safeguards users by accurately detecting and protecting users against leaks of private and sensitive user information. In many implementations, the sensitivity detection system 206 utilizes a sensitivity detection model to detect when user profiles and other collections of user information are unintentionally revealing sensitive user information.

As shown, the sensitivity detection system 206 includes various components and elements, which are implemented in hardware and/or software. For example, the sensitivity detection system 206 includes a user data simulation manager 210 that generates synthetic user browser data (e.g., part of the user browser data 222). In addition, the sensitivity detection system 206 includes a sensitivity detection manager 212 that trains and utilizes a sensitivity detection model 226 to detect sensitivity classifications from user profiles 224. Also, the sensitivity detection system 206 includes a sensitivity response manager 214 that provides one or more mitigation actions when sensitive user information is leaked. Further, the sensitivity detection system 206 includes a storage manager 220 for storing data corresponding to the sensitivity detection system 206. The functions of the components are further discussed below.

In addition, the computing system environment 200 includes the client device 230 having a client application 232. In various implementations, the client device 230 is associated with a user having one or more user identifiers. In many implementations, a user (i.e., represented by a user identifier) interacts with the server device 202 (e.g., the user management system 204 and/or the sensitivity detection system 206), the resource device 240, and/or the web server devices 250 to access content and/or services. The computing system environment 200 can include any number of client devices. As also shown, the client device 230 includes a client application 232. For example, the client application 232 is a web browser application, a mobile application, or another type of application that accesses internet-based content for accessing and receiving digital content. In some implementations, the client device 230 includes a plugin associated with the sensitivity detection system 206 that communicates with the client application 232 to perform mitigating actions. In some implementations, a portion of the sensitivity detection system 206 is integrated into client application 232 to perform mitigating actions.

As shown, the computing system environment 200 includes the resource device 240 which includes a profile generation model 242. In one or more implementations, the sensitivity detection system 206 accesses user profiles 224 generated by the profile generation model 242, which may be operated by another system (e.g., a data aggregator system). In some implementations, the profile generation model 242 is part of the sensitivity detection system 206 and/or is internally connected to the sensitivity detection system 206.

Additionally, the computing system environment 200 includes the web server devices 250 having web services 252. For example, the web services 252 include websites for a user to browse via the client application 232. In some implementations, information from the web services 252 is monitored and stored on the client device 230 in connection with a user identifier (e.g., browsing activity). In many implementations, the user consents to and has full control over user data that is tracked and/or stored.

With a foundation of the sensitivity detection system 206 in place, additional details regarding various functions of the sensitivity detection system 206 will now be described. As a brief roadmap, FIG. 3 relates to generating user profiles utilizing a profile generation model. FIGS. 4A-4C relate to generating synthetic training data that protects the privacy of users, FIGS. 5A-5B relate to generating and utilizing a sensitivity detection machine-learning model to determine when user profiles leak sensitive user information, and FIGS. 6A-6C relate to the sensitivity detection system performing mitigating actions when a leak of sensitive user information is detected.

Figure 3:
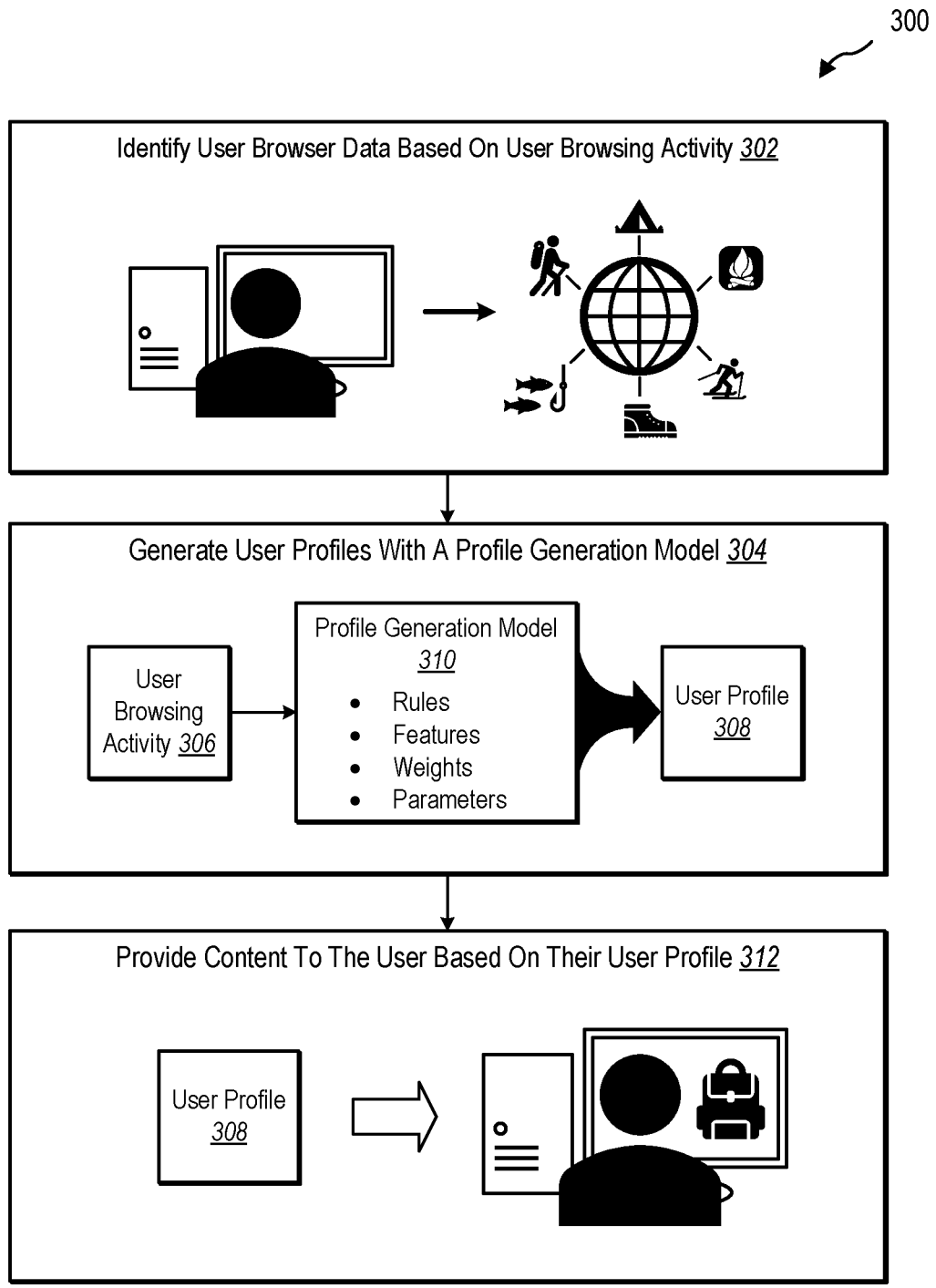
FIG. 3 illustrates an example process flow for generating user profiles with a profile generation model in accordance with one or more implementations.
Figure 4A:
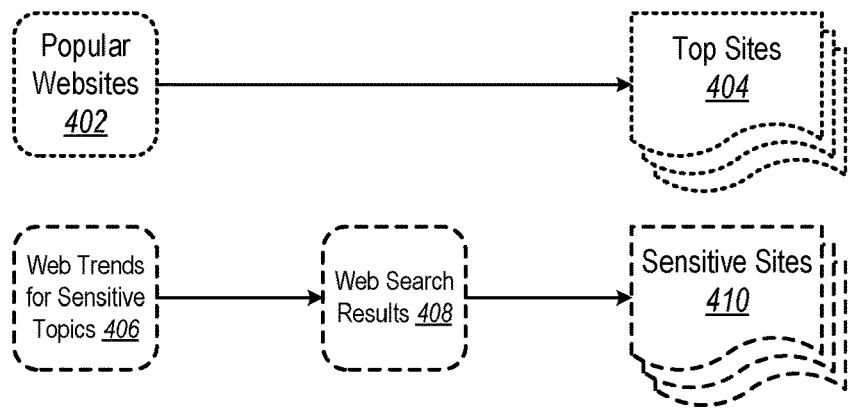
FIGS. 4A-4C illustrate example process flows of generating synthetic training data to train a sensitivity detection model in accordance with one or more implementations.
Figure 4B:
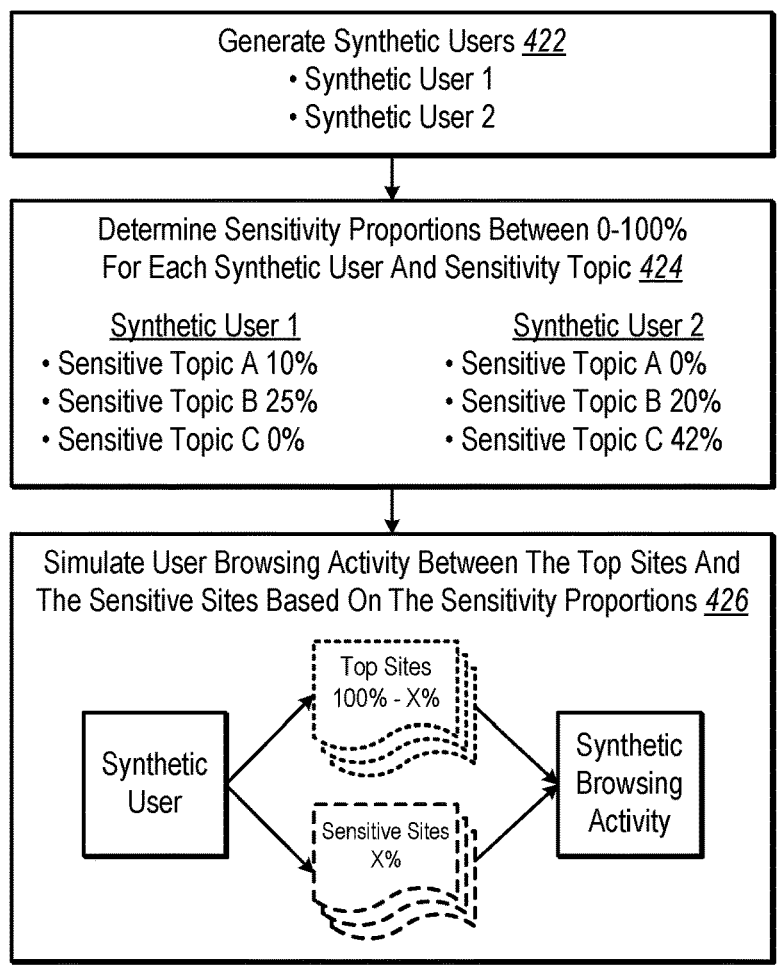
Figure 4C:
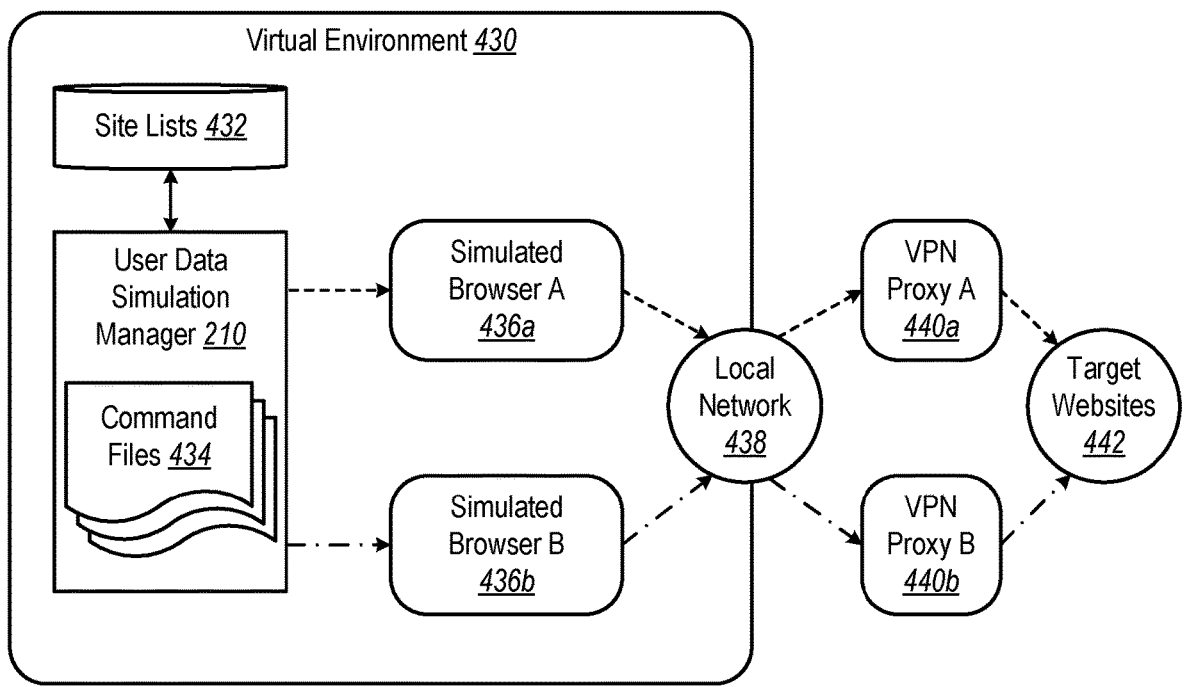

As just mentioned, FIG. 3 relates to generating user profiles utilizing a profile generation model. In particular, FIG. 3 illustrates an example process flow for generating user profiles with a profile generation model in accordance with one or more implementations. As shown, FIG. 3 includes a series of acts 300 that is performed by the sensitivity detection system 206 and/or other systems.

As shown, the series of acts 300 includes an act 302 of identifying user browser data based on user browsing activity. For example, as a user interacts with content and web services via a client device, the web services and/or the client device monitor actions by the user and associate them with the user identifier. In other words, as the user browses the web, a set of actions and labels accumulate based on each website they visit, articles they read, health websites they go to for information, pictures viewed, videos watched, and products shopped. In various implementations, the browser activity of a user is stored in the form of internet cookies, variables, browser or device digital fingerprints, and/or other trackers.

As also shown, the series of acts 300 includes an act 304 of generating user profiles with a profile generation model. For example, the sensitivity detection system 206 or another system, such as a data aggregator system, receives, identifies, or otherwise accesses the user browsing activity 306 associated with the user identifier and provides it to a profile generation model 310. The profile generation model 310 generates a user profile 308 (e.g., an advertising user profile) based on the user browsing activity 306. As mentioned, a user profile 308 often includes a set of descriptive labels that represent the corresponding user identifier.

The profile generation model 310 can utilize rules, features, weights, and/or parameters to generate user profiles. As one example, the profile generation model 310 is a heuristic model that converts the user browsing activity 306 into descriptive labels based on a set of rules. In another example, the profile generation model 310 is a machine-learning model that is trained to learn and encode latent features from the user browsing activity 306 based on tuned weights and parameters, then decode the latent features into descriptive labels.

In various implementations, the profile generation model 310 generates a user profile 308 that includes a set (e.g., a subset) of descriptive labels chosen from among a larger set of potential descriptive labels. For example, some of the descriptive labels include user information corresponding to interests and hobbies, income, car or home ownership, pet status, family relationships, shopping habits, etc. The profile generation model 310 may generate a user profile ranging from a few to thousands of descriptive labels. In various implementations, the labels may include a hierarchical structure (e.g., "hobbies and interests >exercise >running and jogging" or "hobbies and interests >games >board games").

As shown, the series of acts 300 includes an act 312 of providing content to the user based on their user profile. For example, the sensitivity detection system, a data aggregation, system, a digital content delivery system, or another system utilizes user browsing activity 306 to identify and provide digital content to the user via their client device. As shown, backpacking equipment is being served to the user based on their user profile.

As mentioned above, sometimes existing computer systems provide discriminatory or predatory content to a user because the user profile of the user leaks private or sensitive information. For example, the user is served digital content based on their medical condition or another sensitive issue that the user does not wish to reveal. For ease of explanation, this document will refer to the user having a medical condition that they wish to keep private.

As mentioned above, FIGS. 4A-4C relate to generating synthetic training data that protects the privacy of users. In general, FIGS. 4A-4C describe generating and simulating web browsing activity. For instance, to determine whether information about visiting sensitive websites is being leaked through seemingly innocuous labels in a user's profile, the sensitivity detection system 206 trains a sensitivity detection machine-learning model to discover how and when user profiles leak. In particular, FIGS. 4A-4C illustrate example process flows of generating synthetic training data to train a sensitivity detection model in accordance with one or more implementations.

To generate training data, the sensitivity detection system 206 synthetically generates browsing activity of users. As part of simulating this synthetic data, the sensitivity detection system 206 determines various web resources to access in order to accurately mimic real-world users. To accomplish this, the sensitivity detection system 206 identifies both commonly visited and popular websites as well as websites associated with sensitive topics. Part of this process is illustrated in FIG. 4A.

FIG. 4A includes two data streams. The first data stream corresponds to commonly visited websites and includes popular websites 402. For example, popular websites 402 include the top searched-for and/or visited websites in a given region or network. For instance, the sensitivity detection system 206 identifies the popular websites 402 based on website traffic. From the popular websites 402, the sensitivity detection system 206 selects several of the top sites 404. As described below, the top sites 404 can serve as a control when generating the training data.

To determine a list of sensitive sites 410, in various implementations, the sensitivity detection system 206 identifies web trends for sensitive topics 406. For example, the sensitivity detection system 206 identifies popular search terms related to each sensitive topic (e.g., sensitive groups and/or sensitive behaviors) included in a list of sensitive topics. In various implementations, the sensitivity detection system 206 accesses one or more web services that track trending terms associated with these sensitive topics. In some implementations, the sensitivity detection system 206 uses a natural-language processing model or another type of topic grouping machine-learning model to identify terms associated with each sensitive topic from a database or other resource.

The sensitivity detection system 206 then utilizes the terms to perform web queries to obtain or capture a list of resulting web resources (e.g., websites) for each of the sensitive topics (or a portion of them), shown as the web search results 408. In some instances, the sensitivity detection system 206 removes duplicate entries and/or identifies a threshold number of search results for each sensitive topic. Additionally, in various implementations, the sensitivity detection system 206 ranks the list of websites based on one or more metrics (e.g., traffic rank, search score, statistically improbable phrases, a sensitivity score, and/or other metrics) from the web search results 408 to generate the sensitive sites 410 listed for each sensitive topic.

With the top sites 404 and the sensitive sites 410 identified, the sensitivity detection system 206 can proceed to generate synthetic browsing activity. To illustrate, FIG. 4B shows a series of acts 420 for the sensitivity detection system 206 to generate the synthetic browsing activity. As shown in the act 422, the sensitivity detection system 206 generates synthetic users. In various implementations, as part of the act 422 of generating synthetic users, the sensitivity detection system 206 generates a list of user identifiers for a corresponding number of synthetic users.

In some instances, the sensitivity detection system 206 assigns parameters to each user, such as browser application type, geographic local, and/or demographic information. Additionally, in many instances, the sensitivity detection system 206 also assigns browsing activity to synthetic users, such as length of browsing sessions, browsing time windows within a day or week, number of days or months to browse, mouse movement amounts when browsing, and/or duration range at each site.

Additionally, the series of acts 420 includes an act 424 of determining sensitivity proportions between 0-100% for each synthetic user and sensitivity topic. In one or more implementations, the sensitivity detection system 206 splits the user into two initial groups that include a control or baseline group that does not visit any of the sensitive sites 410 and a non-baseline group that visits at least a portion of the sensitive sites 410. Alternatively, in some implementations, the sensitivity detection system 206 assigns each user to either zero, one, or more sensitive topics. For example, the sensitivity detection system 206 assigns users to sensitive topics according to recent statistical data that matches real-world ratios.

As shown, the sensitivity detection system 206 assigns Synthetic User 1 a sensitivity proportion of 10% to Sensitive Topic A, a sensitivity proportion of 25% to Sensitive Topic B, and a sensitivity proportion of 0% to Sensitive Topic C. In this example, the remaining 65% is assigned to non-sensitive topics. Using a different approach, the sensitivity detection system 206 assigns each sensitivity topic assigned to the synthetic user a sensitivity proportion between 0-100%.

For each synthetic user that is assigned to one or more sensitive topics, the sensitivity detection system 206 can determine a sensitivity amount of proportion. For example, as shown in connection with the act 424, the sensitivity detection system 206 assigns a number between 0-100% for each of the three sensitive topics shown. In one or more implementations, the sensitivity proportion or amount is assigned randomly. In some implementations, the sensitivity detection system 206 utilizes a non-random or uniform distribution when assigning sensitivity amounts for the sensitive topics.

As shown, the series of acts 420 includes an act 426 of simulating user browsing activity between the top sites 404 and the sensitive sites 410 based on the sensitivity proportions. For example, for each synthetic user, the sensitivity detection system 206 visits the top sites 404 and the sensitive sites 410 in accordance with the assigned sensitivity proportions. To illustrate, for Synthetic User 1, the sensitivity detection system 206 visits websites corresponding to Sensitive Topic A 10% of the time, websites corresponding to Sensitive Topic B 25% of the time (e.g., X %=10%+25%=35%), and websites corresponding to non-sensitive topics 65% of the time (e.g., 100%–X % or 100%–35%).

With the second approach where each sensitivity topic assigned to the synthetic user is given an independent sensitivity proportion between 0-100% (e.g., X %), the sensitivity detection system 206 selects a number of websites (e.g., 20 sites or 5,000) and visits both websites corresponding to the given sensitivity topic as well as websites corresponding to non-sensitive topics in accordance with the assigned sensitivity proportion (e.g., X % and 100%–X %).

When visiting websites for non-sensitive topics, in various implementations, the sensitivity detection system 206 browses websites from among the top sites 404. For example, the sensitivity detection system 206 selects one or more websites from the top sites 404 to visit and/or browse. In various implementations, the sensitivity detection system 206 randomly selects a website to visit. In some implementations, the sensitivity detection system 206 weights the selection based on website ranking. For example, the sensitivity detection system 206 browses higher-ranked websites more frequently than lower-ranked ones.

Similarly, when visiting websites corresponding to a given sensitive topic, the sensitivity detection system 206 utilizes the sensitive sites 410 corresponding to the given sensitive topic to select websites to visit. Additionally, the sensitivity detection system 206 can alternate between websites corresponding to non-sensitive topics with websites corresponding to one or more sensitive topics.

As shown, the act 426 includes simulating user browsing activity between the top sites 404 and the sensitive sites 410. Accordingly, in various implementations, the sensitivity detection system 206 mimics real-world browsing behaviors and browsing activities for each synthetic user when visiting selected sites. For example, the sensitivity detection system 206 utilizes instructions that simulate real user browsing habits when visiting websites, such as mouse and scroll movement, linger time, selecting links within a website, and/or other browsing behaviors described above. In this manner, as each synthetic user generates browsing activity, the data collected for the synthetic user is the same or very similar to that of a real user's browsing activity.

To further illustrate, FIG. 4C shows an example of a virtual environment 430 where the sensitivity detection system 206 operates synthetic users. For example, a host device includes a virtual machine that implements the virtual environment 430. As shown, the virtual environment 430 includes the user data simulation manager 210 introduced above.

In various implementations, the user data simulation manager 210 receives site lists 432, which includes both the top sites 404 and the sensitive sites 410. Additionally, the user data simulation manager 210 includes command files 434, which includes various instructions for creating and managing synthetic users.

Additionally, the virtual environment 430 shows two simulated browsers (Simulated Browser A 436*a* and Simulated Browser B 436*b*). In various implementations, the sensitivity detection system 206 assigns a unique synthetic user to each browser, with Simulated Browser A 436*a* being assigned the first synthetic user and Simulated Browser B 436*b* being assigned the second synthetic user. In various implementations, the sensitivity detection system 206 generates an independent simulated browser for each synthetic user, allowing each synthetic user to maintain and store their own browser activity as they visit assigned websites over time. This approach ensures that the stored browser activity, such as internet cookies collected over time, matches that of real-world users.

As shown, the virtual environment 430 includes a local network 438 that allows synthetic users to access internet websites and web services, such as the target websites 442. Additionally, in various implementations, synthetic users can be assigned to one or more proxies and/or virtual private networks (VPNs). To illustrate, FIG. 4C includes two VPN proxies (VPN Proxy A 440*a* and VPN Proxy B 440*b*). For example, each proxy allows the synthetic user to appear to be located in different geographic and/or network locations, in order to more accurately emulate real-world users with different network addresses (e.g., internet protocol (IP) addresses).

To illustrate by way of a non-limiting example, the sensitivity detection system 206 generates 30,000 synthetic users who visit a mix of the top 500 popular sites and sensitive websites (based on 60 sensitive topics). The sensitivity detection system 206 assigned each synthetic user a sequence of 500 sites to visit, which was split between browsing sessions of varying lengths over a time period of at least two months. Additionally, the sensitivity detection system 206 spread the synthetic users across about 1,200 VPN proxies. Further, the sensitivity detection system 206 allowed cookies and other trackers to accumulate during browsing and maintained them between sessions. In some instances, the sensitivity detection system 206 waited for a threshold time (e.g., a week or eight days) after the browsing activity of a synthetic user was completed to allow the browser activity to stabilize before generating a user profile for the user.

In this manner, the sensitivity detection system 206 generates training data by simulating browser activity and generating user profiles from the simulated data. Further, because the sensitivity detection system 206 knows which sensitive topics are associated with which synthetic users, the sensitivity detection system 206 also generates ground-truth data (e.g., ground-truth sensitivity classifications) corresponding to each user profile (e.g., training user profiles) as part of the training data (e.g., how strongly each user profile is correlated to one or more given sensitive topics).

Figure 5A:
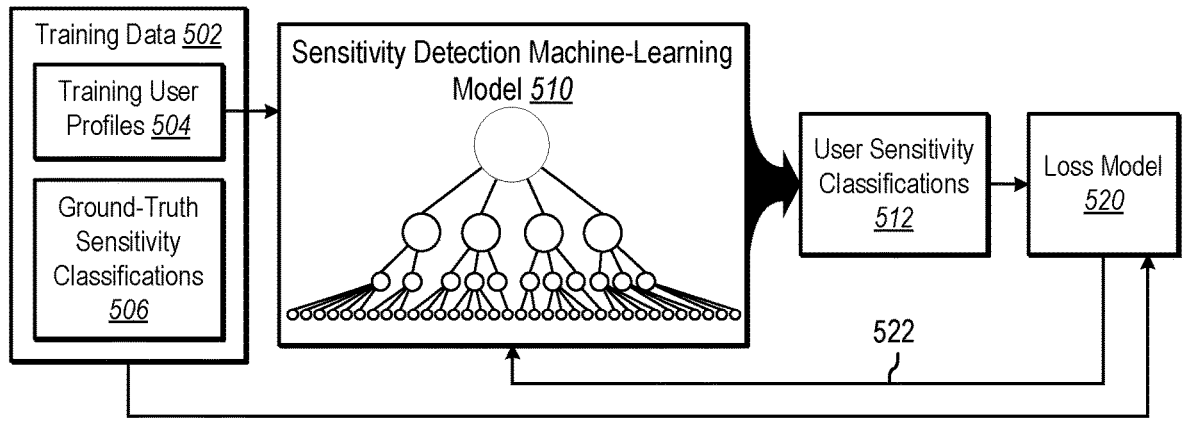
FIGS. 5A-5B illustrate example block diagrams for training and utilizing the sensitivity detection model in accordance with one or more implementations.
Figure 5B:
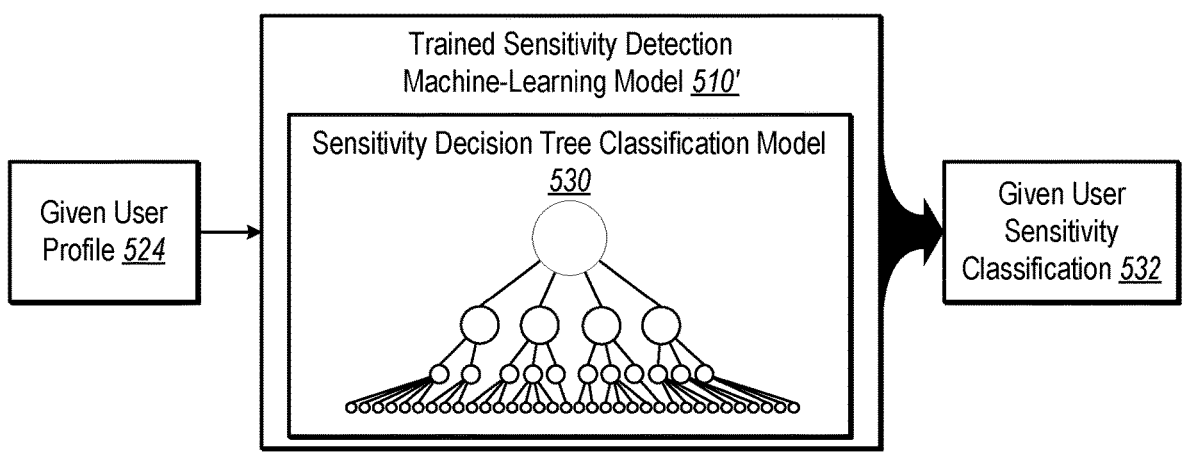

Turning to FIGS. 5A-5B, additional details are provided for generating and utilizing a sensitivity detection machine-learning model. For example, FIG. 5A corresponds to actions of training a sensitivity detection machine-learning model. FIG. 5B corresponds to actions of determining sensitivity classifications from user profiles utilizing the trained sensitivity detection machine-learning model.

As shown, FIG. 5A includes training data 502, a sensitivity detection machine-learning model 510, user sensitivity classifications 512, and a loss model 520. As also shown, the training data 502 includes training user profiles 504 and ground-truth sensitivity classifications 506, which were described above. For example, the training user profiles 504 includes sets of descriptive benign labels describing a corresponding user (e.g., synthetic user).

In various implementations, the sensitivity detection machine-learning model 510 is a decision tree machine-learning model. For example, the sensitivity detection machine-learning model 510 is a multi-class decision tree classifier that predicts a sensitivity classification using a set of descriptive labels from user profiles as features. In some instances, each node in the decision tree machine-learning model represents a binary decision about whether a given label is or is not present in the user profile. In one or more implementations, the sensitivity detection system 206 trains the decision tree machine-learning model with a depth of 90 and a minimum (or average) leaf size of 5. Additionally, in some cases, the sensitivity detection system 206 utilizes an uneven distribution metric as the splitting algorithm when generating the sensitivity detection machine-learning model 510.

As shown, the training data 502 is provided to the sensitivity detection machine-learning model 510. In particular, the training user profiles 504 are provided to the sensitivity detection machine-learning model 510, which trains to generate user sensitivity classifications 512 using the descriptive labels as features. Indeed, the sensitivity detection system 206 trains the sensitivity detection machine-learning model 510 to accurately re-identify when a synthetic user is correlated with one or more sensitive topics. In various implementations, the sensitivity detection system 206 trains the sensitivity detection machine-learning model 510 to classify a given user profile of a simulated user with a particular sensitivity classification when the synthetic user browsed over a threshold number of websites associated with the sensitivity classification.

During training, the loss model 520 compares the user sensitivity classifications 512 to corresponding sensitivity classifications from the ground-truth sensitivity classifications 506 to determine an amount of loss or error. The loss model 520 may utilize one or more loss functions to determine a loss amount, which is provided back to the sensitivity detection machine-learning model 510 as feedback 522 to tune weights, parameters, layers, and/or nodes of the model. In this manner, the sensitivity detection system 206 trains the sensitivity detection machine-learning model 510 via back-propagation in an end-to-end manner until the model converges or satisfies another training criterion.

Further, by training a decision tree model (i.e., decision tree machine-learning model), the sensitivity detection system 206 can track one or more decision paths of descriptive labels taken to result in a particular sensitivity description. Additionally, the sensitivity detection system 206 can identify which descriptive labels are the most indicative of a particular sensitive topic (e.g., regardless of decision path). In this manner, the trained decision tree model is able to accurately detect when a user profile leaks sensitive information, indicate which sensitive topics are being leaked, and determine what descriptive labels in the user profile prompted, caused, or triggered the leak of sensitive user information.

In one case, the trained sensitivity detection machine-learning model was found to achieve a 77.4% re-identification accuracy rate compared to a control/baseline classifier using random assignment, which would achieve a 2.08% re-identification accuracy rate. Further, the trained sensitivity detection machine-learning model is able to re-identify a sensitive topic for 63% of users with 99% precision based on an average of 5 descriptive labels. As noted above, user profiles commonly have hundreds to thousands of descriptive labels.

While a decision tree model is generated in some instances, in other instances, the sensitivity detection system 206 generates another type of machine-learning model. For example, the sensitivity detection system 206 utilizes the training data to generate a convolutional neural network. Indeed, the sensitivity detection system 206 utilizes the training data to supervise the training of various types of machine-learning models and/or neural networks. In this way, the sensitivity detection system 206 generates a sensitivity detection machine-learning model 510 that very accurately identifies how seemingly innocuous interests of a user are related to belonging to a sensitive group or having an interest in a sensitive topic.

As shown, FIG. 5B includes a given user profile 524, a trained sensitivity detection machine-learning model 510', and a given user sensitivity classification 532. As shown, the trained sensitivity detection machine-learning model 510' includes a sensitivity decision tree classification model 530.

In various implementations, the given user profile 524 corresponds to a real user rather than a synthetic user. The sensitivity detection system 206 receives the given user profile 524 directly or directly from browser activity of the given user. For example, the sensitivity detection system 206 receives the given user profile 524 from a profile generation model. Additionally, the sensitivity detection system 206 utilizes the sensitivity decision tree classification model 530 to generate the given user sensitivity classification 532 for the given user. Indeed, the given user sensitivity classification 532 may reveal one or more sensitivity classifications of the given user that they prefer to remain private.

In some implementations, the sensitivity detection system 206 utilizes the trained sensitivity detection machine-learning model 510' to classify the given user profile 524 as sensitive to one or more sensitive topics or as non-sensitive. In particular, the sensitivity detection system 206 provides descriptive labels of the given user profile 524 to the sensitivity decision tree classification model 530, which classifies the given user profile 524 based on the decision paths within the sensitivity decision tree classification model 530 as either non-sensitive or belonging to one or more sensitive topics.

Upon determining a sensitivity classification for a given user (or multiple users), the sensitivity detection system 206 can perform one or more mitigating steps to prevent future leakage of sensitive user information and/or prevent the user from being improperly targeted by digital content providers. As mentioned above, FIGS. 6A-6C provide additional details regarding the sensitivity detection system performing mitigating actions.

Figure 6A:
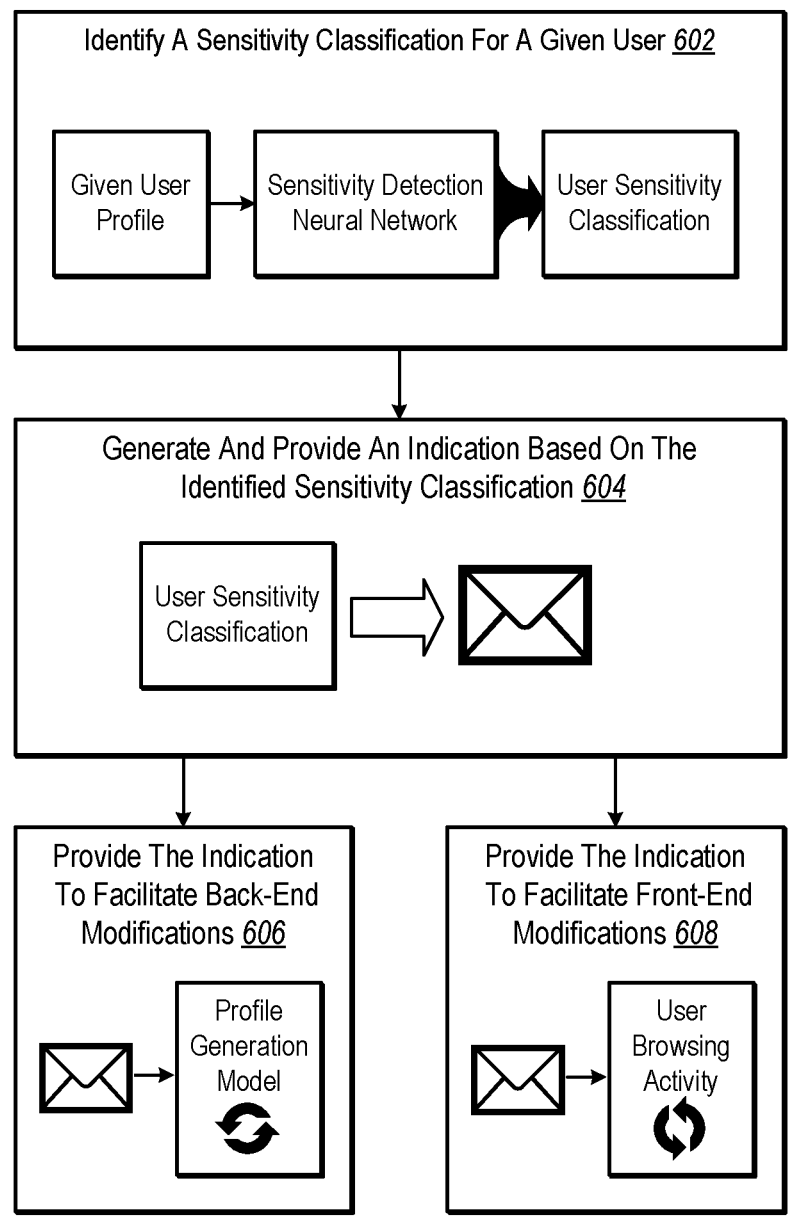
FIGS. 6A-C illustrate an example process flow for performing mitigating actions based on detecting leaked sensitive user information in accordance with one or more implementations.

To illustrate, FIG. 6A includes a series of acts 600 performed by the sensitivity detection system 206. As shown, the act 602 includes the sensitivity detection system 206 identifying a sensitivity classification for a given user. For example, as previously described, the sensitivity detection system 206 utilizes a sensitivity detection neural network to determine that the user profile for a given user reveals sensitive user information that the given user would like to remain private.

As shown, the series of acts 600 includes an act 604 of generating and providing an indication based on the identified sensitivity classification. For example, the sensitivity detection system 206 determines whether to send one or more indications, where to send the indications, and what to include in the indications. For instance, the sensitivity detection system 206 determines to send a first set of information to a first target recipient and a different, second set of information to a second target recipient. In some implementations, the recipient is a backend device and is instructed to make system-wide modifications. In one or more implementations, the recipient is a frontend device, such as a client device, and is instructed to make modifications that affect individual users.

To illustrate, in various implementations, the sensitivity detection system 206 generates an indication to provide to a backend device. As shown, the series of acts 600 includes an act 606 of providing the indication to facilitate back-end modifications. Indeed, in various implementations, the sensitivity detection system 206 provides an audit of back-end devices and services with regard to leaky sensitivity topics. An audit allows back-end devices and services to get accurate feedback that enables removing undesirable effects of their profile generation process where the system is otherwise a black box whose inner workings are difficult or impossible to discover. For example, the device receiving the indication uses it to modify the algorithm and/or the rules that generate one or more descriptive topics to disassociate them from sensitive topics. In this manner, systems and models can ensure that they generate user profiles that do not inadvertently reveal sensitive topics about a given user.

Further, in many instances, the instructions provide real-time feedback about how to better generate user profiles that protect against the leaking of sensitive user information. As an example, the sensitivity detection system 206 generates an indication that indicates information that causes the device implementing the profile generation model to modify one or more features to disassociate one or more given user profiles (or subsets of descriptive labels) from a particular sensitivity classification. For example, the profile generation model continues to change one or more descriptive label features, weights, associates, and/or connections with respect to browser activity of a given user until the profile generation model does not generate a user profile for the given user that leaks the particular sensitivity information.

In various implementations, the indication to the profile generation model causes the profile generation model to generate a different set of descriptive labels for a user profile. For example, the profile generation model generates a first set of descriptive labels for a given user profile, which the sensitivity detection system 206 determines is leaking sensitive user information. Upon receiving the indication from the sensitivity detection system 206, the profile generation model changes how it determines descriptive labels and generates a different, second set of descriptive labels for the given user profile by using the same browser activity as before. The sensitivity detection system 206 can then confirm that the updated user profile for the given user does not leak sensitive user information.

In some implementations, the indication causes one or more descriptive labels to be removed. Indeed, in some implementations, the indication includes the particular sensitivity topic that was leaked, references the given user profile, and/or lists a set of descriptive labels that likely resulted in the leaked sensitive topic (e.g., one or more decision paths for classifying the given user profile to a particular sensitivity classification).

As shown, the series of acts 600 includes an act 608 of providing the indication to facilitate front-end modifications. For example, the sensitivity detection system 206 may provide a variety of messages that result in front-end changes at the client device. For instance, the sensitivity detection system 206 sends an indication that automatically triggers the client device to act and/or allows a user to know about the potential consequences of particular actions, as further provided below in FIGS. 6B and 6C.

Figure 6B:
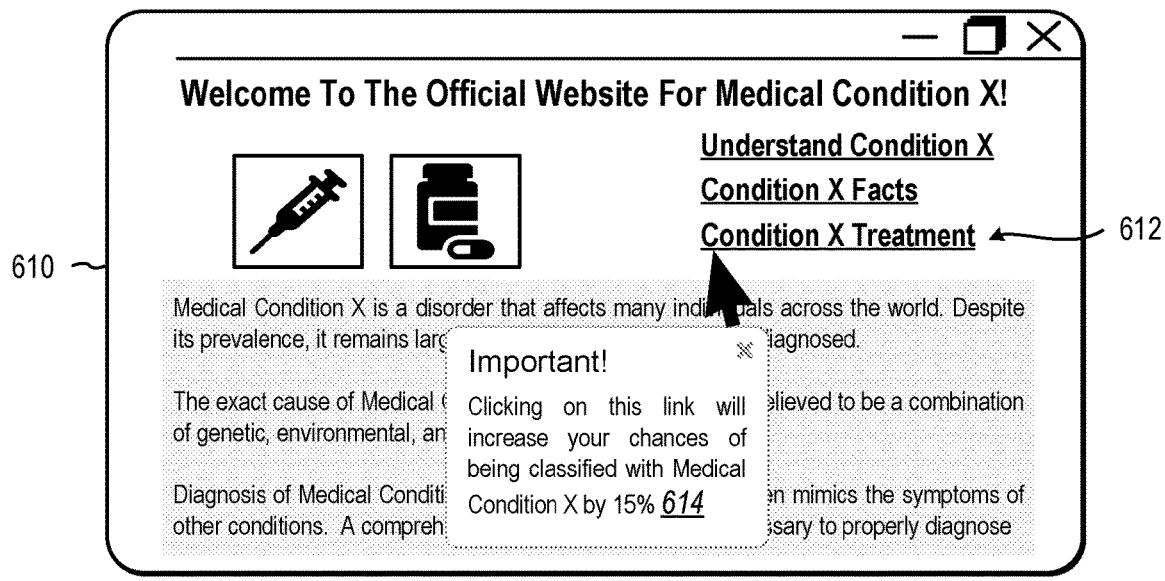

To illustrate, FIG. 6B shows a graphical user interface on a client device of a website 610 for Medical Condition X. The website 610 includes various links to more information regarding Medical Condition X, such as a treatment link 612 for Medical Condition X.

The user may have Medical Condition X but does not want to reveal this private information to others. However, based on the user's browser activity, the user profile for the user may unintentionally reveal or be close to unintentionally revealing that the user has Medical Condition X to third parties. Accordingly, in one or more implementations, the sensitivity detection system 206 utilizes the sensitivity detection machine-learning model to proactively anticipate how a user's potential browsing actions may result in leaked user information.

To illustrate, in response to detecting that the user is about to select the treatment link 612, the sensitivity detection system 206 determines how adding the action of visiting the treatment link 612 would impact sensitive information about Medical Condition X being leaked. As shown, the sensitivity detection system 206 determines that visiting the treatment link 612 (e.g., an online resource) increases the chance of revealing that the user has Medical Condition X by 15%. In response, the sensitivity detection system 206 provides a visual indication 614 of such to the user before the user selects the treatment link 612. In this manner, the sensitivity detection system 206 performs mitigation actions that allow the user to not increase the likelihood that their sensitive user information will be leaked, which are further described below.

In one or more implementations, the sensitivity detection system 206 make provides reports to the user regarding their current status with regard to sensitive topics. For example, the sensitivity detection system 206 provides a report to the user that indicates the probability that one or more sensitive topics are being leaked. Further, the sensitivity detection system 206 can show trends and other statistics of how the probabilities have changed over time.

Figure 6C:
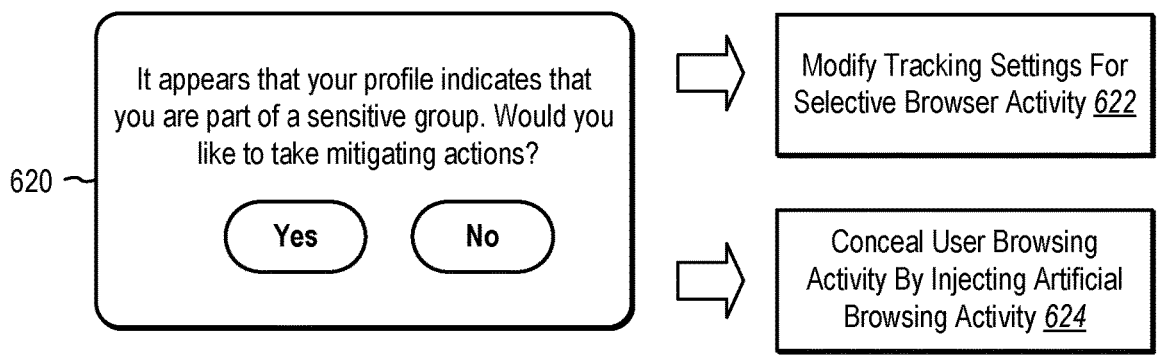

As noted above in some implementations, the sensitivity detection system 206 performs one or more mitigation actions to prevent and reduce future leaks of sensitive topics. The sensitivity detection system 206 may perform these actions automatically or based on a user selection. To illustrate, FIG. 6C shows a prompt 620 altering the user to the chance of their sensitive user information being leaked and options to perform mitigating actions.

The sensitivity detection system 206 can perform one or more mitigation actions to prevent and reduce future leaks of sensitive topics, which can be performed automatically or based on user selection. As shown in the prompt 620 in FIG. 6C, the sensitivity detection system 206 may perform an act 622 of modifying tracking settings for select browser activities. For instance, the sensitivity detection system 206 directly, or by communicating with a client application on the client device, enables private or non-tracked browsing (e.g., do-not-track mode) for all of the user's browsing activity or the browser activity corresponding to one or more sensitive topics. For example, if the user visits the website 610 and/or selects the treatment link 612, the sensitivity detection system 206 can enable (or provide a message to the client application for it to enable) non-tracked browsing to prevent sensitive browsing activity data from being added to the user's browser activity used to generate the user profile of the user. In some cases, the sensitivity detection system 206 may also remove sensitive browser activity data from a user's browser activity (e.g., removes portions of browser activity stored on the client device directly or via the client application). This helps to safeguard the user's sensitive information and avoid unintentional data leaks.

As shown on the bottom right box, the sensitivity detection system 206 may perform an act 624 of concealing user browser activity of a user by injecting artificial browsing activity. For instance, the sensitivity detection system 206 generates, loads, or otherwise obtains browsing activity that is contrary to sensitive topics or unrelated topics in general. To illustrate, the sensitivity detection system 206 conceals Medical Condition X by supplementing the user's browser activity with visits and interactions at websites related to exercise, vacation, news, or other opposing and/or unrelated topics. As another example, the sensitivity detection system 206 revisits, spawns, and/or injects more browser activity from non-sensitive websites that the user previously visited (e.g., weighted by recency, frequency, and/or preferences). In various instances, the sensitivity detection system 206 supplements the browsing activity of the user with default or generic browsing activity. In one or more implementations, the sensitivity detection system 206 provides the supplemented and/or artificial browsing activity to the client application on the client device for the client application to store it as if the user generated the supplemental browsing activity.

In some instances, the sensitivity detection system 206 visits or timestamps the visits to the non-sensitive websites around the same time as when the user visits websites related to Medical Condition X. In various implementations, the sensitivity detection system 206 includes a significant amount of non-sensitive browser activity data (e.g., 3, 5, 10, or 50 times) to better conceal the sensitive browser activity.

Indeed, the sensitivity detection system 206 may perform various actions to conceal the user's sensitive browsing activity.

Figure 7:
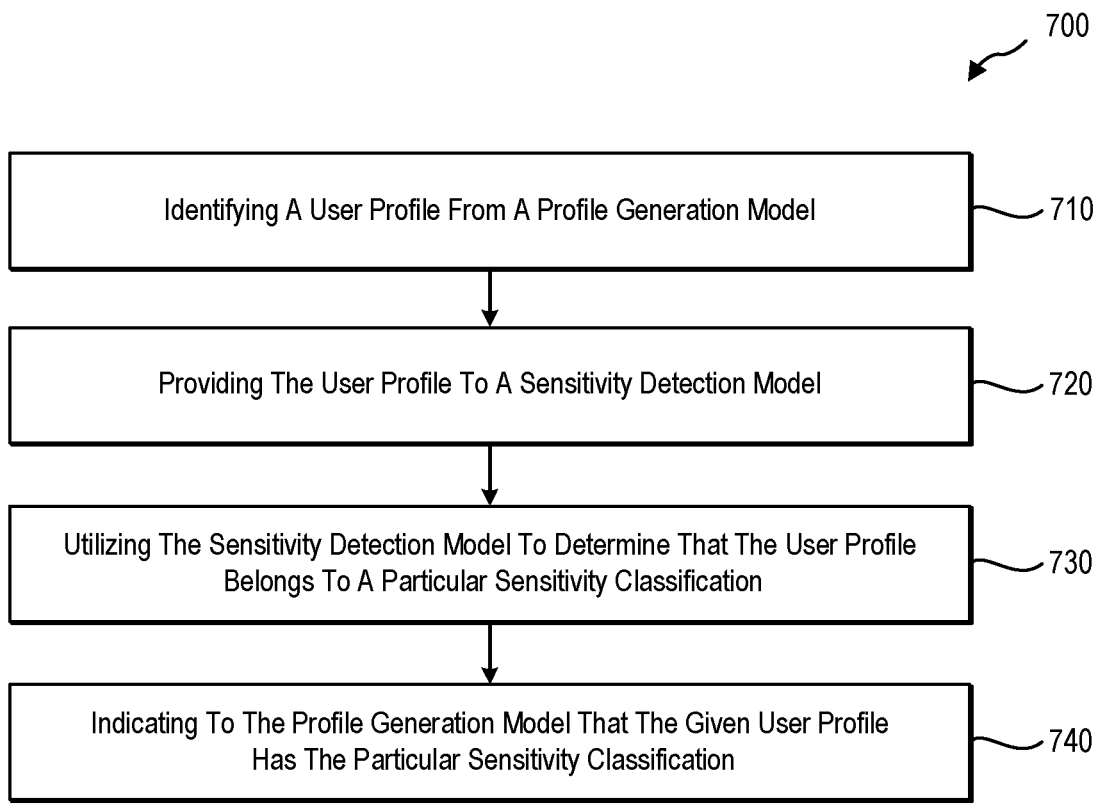
FIG. 7 illustrates an example series of acts for determining a ranked list of relevant monitoring incident tickets corresponding to an outage ticket in accordance with one or more implementations.

Turning now to FIG. 7, this figure illustrates an example flowchart that includes a series of acts 700 for utilizing the sensitivity detection system 206 in accordance with one or more implementations. In particular, FIG. 7 illustrates an example series of acts for determining a ranked list of relevant monitoring incident tickets corresponding to an outage ticket in accordance with one or more implementations.

While FIG. 7 illustrates acts according to one or more implementations, alternative implementations may omit, add to, reorder, and/or modify any of the acts shown. Further, the acts of FIG. 7 can be performed as part of a method (e.g., a computer-implemented method). Alternatively, a non-transitory computer-readable medium can include instructions that, when executed by a processing system comprising a processor, cause a computing device to perform the acts of FIG. 7. In still further implementations, a system (e.g., a processing system comprising a processor) can perform the acts of FIG. 7.

In one or more implementations, the system includes a given user profile of a given user identifier generated by a profile generation model that generates user profiles for user identifiers including one or more descriptive labels for each user identity; a sensitivity detection machine-learning model trained to classify users to sensitivity classifications based on the user profiles; at least one processor at a server device; and/or a computer memory including instructions that, when executed by the at least one processor at the server device, cause the system to carry out one or more operations or actions As shown, the series of acts 700 includes an act 710 of identifying a user profile from a profile generation model. For instance, in example implementations, the act 710 involves identifying a given user profile generated by a profile generation model based on browsing activity associated with a given user identifier. In various implementations, the act 710 includes generating the given user profile of the given user identifier by a profile generation model based on browsing activity.

In one or more implementations, the act 710 includes identifying the given user profile by providing the browsing activity associated with the given user identifier to the profile generation model and/or receiving the given user profile including a first subset of descriptive labels for the given user profile from a set of descriptive labels. In some implementations, modifying one or more features of the profile generation model causes the profile generation model to utilize a second set of features to determine a second subset of descriptive labels for the given user profile from the set of descriptive labels.

As further shown, the series of acts 700 includes an act 720 of providing the user profile to a sensitivity classification model. For instance, in example implementations, the act 720 involves providing the given user profile to a sensitivity detection machine-learning model trained to classify users to sensitivity classifications based on user profiles. In some implementations, the act 720 includes utilizing a decision-tree model as the sensitivity detection machine-learning model, which provides a decision path for classifying the given user profile to the particular sensitivity classification. In some implementations, the decision path indicates a combination of descriptive labels identified for the given user profile that resulted in the particular sensitivity classification, and/or the indication indicates that the combination of descriptive labels resulted in the given user profile being classified to the particular sensitivity classification.

As further shown, the series of acts 700 includes an act 730 of utilizing the sensitivity classification model to determine that the user profile belongs to a particular sensitivity classification. For instance, in example implementations, the act 730 involves determining, by the sensitivity detection machine-learning model, that the given user profile is classified as a particular sensitivity classification (e.g., a particular sensitivity topic). In various implementations, the act 730 includes providing the given user profile to the sensitivity detection machine-learning model to determine that the given user profile is classified as a particular sensitivity classification.

As further shown, the series of acts 700 includes an act 740 of indicating to the profile generation model that the given user profile has the particular sensitivity classification. For instance, in example implementations, the act 740 involves providing, based on the particular sensitivity classification, the profile generation model with an indication that the given user profile is classified as the particular sensitivity classification. In some implementations, the act 740 includes providing a visual indication to a client device associated with a given user that the given user profile has been determined to be associated with the particular sensitivity classification.

In various implementations, the act 740 causes the profile generation model to modify one or more features of the profile generation model that will disassociate the given user profile from the particular sensitivity classification. In one or more implementations, the act 740 includes causes the profile generation model to disassociate the given user profile from the particular sensitivity classification by causing the profile generation model to determine different descriptive labels for the given user profile that was previously determined.

In some implementations, the series of acts 700 includes additional acts. For example, in certain implementations, the series of acts 700 includes an act of supplementing, based on the particular sensitivity classification of the given user identifier, the browsing activity of the given user identifier with artificial browsing activity not associated with the particular sensitivity classification.

In various implementations, the series of acts 700 includes an act of generating a set of training data that simulates the browsing activity of users associated with a plurality of sensitivity classifications. In some implementations, the series of acts 700 includes generating an additional set of training data that simulates additional browsing activity of control users not associated with the plurality of sensitivity classifications. In one or more implementations, generating the set of training data that simulates the browsing activity of the users associated with the plurality of sensitivity classifications includes generating, over a period of months, simulated users that visit or browse a random number of websites associated with one or more sensitivity classifications in addition to visiting browsing additional websites not associated with the one or more sensitivity classifications. In various implementations, the series of acts 700 includes generating the sensitivity detection machine-learning model by tuning the sensitivity detection machine-learning model to classify a user profile of a simulated user that visited over a threshold number of websites associated with the particular sensitivity classification to the one or more sensitivity classifications.

In some implementations, the series of acts 700 includes an act of identifying a potential interaction with an online resource by the given user; determining how adding the online resource changes the given user profile of the user; and/or providing, when the potential interaction changes a classification status of a sensitivity classification, an additional indication to the user that performing the potential interaction with the online resource will change the classification status of the sensitivity classification.

In addition, the network described herein may represent a network or a combination of networks (such as the Internet, a corporate intranet, a virtual private network (VPN), a local area network (LAN), a wireless local area network (WLAN), a cellular network, a wide area network (WAN), a metropolitan area network (MAN), or a combination of two or more such networks) over which one or more computing devices may access the sensitivity detection system 206. Indeed, the networks described herein may include one or multiple networks that use one or more communication platforms or technologies for transmitting data. For example, a network may include the Internet or other data link that enables transporting electronic data between respective client devices and components (e.g., server devices and/or virtual machines thereon) of the cloud computing system.

Further, upon reaching various computer system components, program code means in the form of computer-executable instructions or data structures can be transferred automatically from transmission media to non-transitory computer-readable storage media (devices), or vice versa. For example, computer-executable instructions or data structures received over a network or data link can be buffered in random-access memory (RAM) within a network interface module (NIC), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions include, for example, instructions and data that, when executed by a processor, cause a general-purpose computer, special-purpose computer, or special-purpose processing device to perform a certain function or group of functions. In some implementations, computer-executable instructions are executed by a general-purpose computer to turn the general-purpose computer into a special-purpose computer implementing elements of the disclosure. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Figure 8:
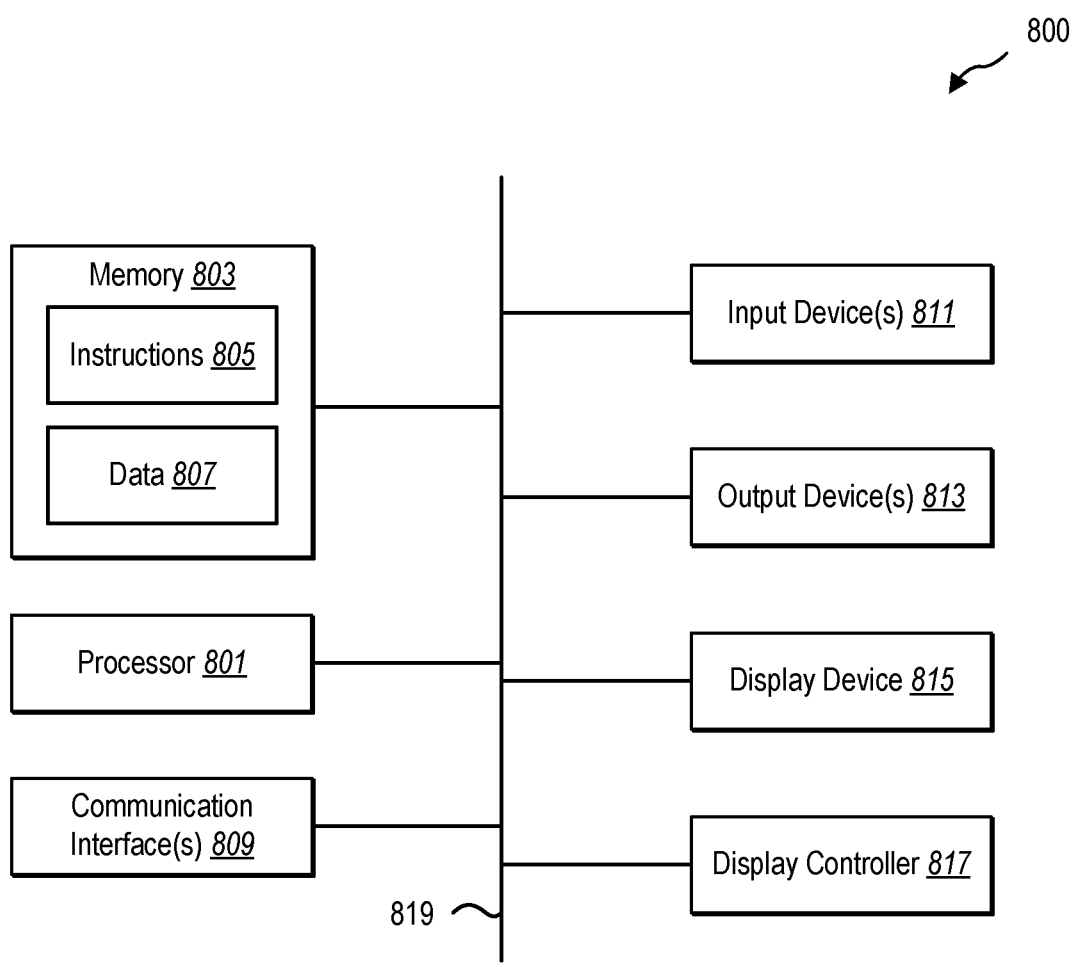
FIG. 8 illustrates example components included within a computer system.

FIG. 8 illustrates certain components that may be included within a computer system 800. The computer system 800 may be used to implement the various computing devices, components, and systems described herein. As used herein, a "computing device" refers to electronic components that perform a set of operations based on a set of programmed instructions. Computing devices include groups of electronic components, client devices, server devices, etc.

In various implementations, the computer system 800 represents one or more of the client devices, server devices, or other computing devices described above. For example, the computer system 800 may refer to various types of network devices capable of accessing data on a network, a cloud computing system, or another system. For instance, a client device may refer to a mobile device such as a mobile telephone, a smartphone, a personal digital assistant (PDA), a tablet, a laptop, or a wearable computing device (e.g., a headset or smartwatch). A client device may also refer to a non-mobile device such as a desktop computer, a server node (e.g., from another cloud computing system), or another non-portable device.

The computer system 800 includes a processing system including a processor 801. The processor 801 may be a general-purpose single- or multi-chip microprocessor (e.g., an Advanced Reduced Instruction Set Computer (RISC) Machine (ARM)), a special-purpose microprocessor (e.g., a digital signal processor (DSP)), a microcontroller, a programmable gate array, etc. The processor 801 may be referred to as a central processing unit (CPU). Although the processor 801 shown is just a single processor in the computer system 800 of FIG. 8, in an alternative configuration, a combination of processors (e.g., an ARM and DSP) could be used.

The computer system 800 also includes memory 803 in electronic communication with the processor 801. The memory 803 may be any electronic component capable of storing electronic information. For example, the memory 803 may be embodied as random-access memory (RAM), read-only memory (ROM), magnetic disk storage media, optical storage media, flash memory devices in RAM, on-board memory included with the processor, erasable programmable read-only memory (EPROM), electrically erasable programmable read-only memory (EEPROM), registers, and so forth, including combinations thereof.

The instructions 805 and the data 807 may be stored in the memory 803. The instructions 805 may be executable by the processor 801 to implement some or all of the functionality disclosed herein. Executing the instructions 805 may involve the use of the data 807 that is stored in the memory 803. Any of the various examples of modules and components described herein may be implemented, partially or wholly, as instructions 805 stored in memory 803 and executed by the processor 801. Any of the various examples of data described herein may be among the data 807 that is stored in memory 803 and used during the execution of the instructions 805 by the processor 801.

A computer system 800 may also include one or more communication interface(s) 809 for communicating with other electronic devices. The one or more communication interface(s) 809 may be based on wired communication technology, wireless communication technology, or both. Some examples of the one or more communication interface(s) 809 include a Universal Serial Bus (USB), an Ethernet adapter, a wireless adapter that operates in accordance with an Institute of Electrical and Electronics Engineers (IEEE) 802.11 wireless communication protocol, a Bluetooth® wireless communication adapter, and an infrared (IR) communication port.

A computer system 800 may also include one or more input device(s) 811 and one or more output device(s) 813. Some examples of the one or more input device(s) 811 include a keyboard, mouse, microphone, remote control device, button, joystick, trackball, touchpad, and light pen. Some examples of the one or more output device(s) 813 include a speaker and a printer. A specific type of output device that is typically included in a computer system 800 is a display device 815. The display device 815 used with implementations disclosed herein may utilize any suitable image projection technology, such as liquid crystal display (LCD), light-emitting diode (LED), gas plasma, electroluminescence, or the like. A display controller 817 may also be provided, for converting data 807 stored in the memory 803 into text, graphics, and/or moving images (as appropriate) shown on the display device 815.

The various components of the computer system 800 may be coupled together by one or more buses, which may include a power bus, a control signal bus, a status signal bus, a data bus, etc. For clarity, the various buses are illustrated in FIG. 8 as a bus system 819.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or a combination of hardwired and wireless data links) through a network, both perform tasks. In a distributed system environment, program modules may be located in both local and remote memory storage devices.

The techniques described herein may be implemented in hardware, software, firmware, or any combination thereof unless specifically described as being implemented in a specific manner. Any features described as modules, components, or the like may also be implemented together in an integrated logic device or separately as discrete but interoperable logic devices. If implemented in software, the techniques may be realized at least in part by a non-transitory processor-readable storage medium including instructions that, when executed by at least one processor, perform one or more of the methods described herein. The instructions may be organized into routines, programs, objects, components, data structures, etc., which may perform particular tasks and/or implement particular data types, and which may be combined or distributed as desired in various implementations.

Computer-readable media can be any available media that can be accessed by a general-purpose or special-purpose computer system. Computer-readable media that store computer-executable instructions are non-transitory computer-readable storage media (devices). Computer-readable media that carry computer-executable instructions are transmission media. Thus, by way of example, implementations of the disclosure can include at least two distinctly different kinds of computer-readable media: non-transitory computer-readable storage media (devices) and transmission media.

As used herein, non-transitory computer-readable storage media (devices) may include RAM, ROM, EEPROM, CD-ROM, solid-state drives (SSDs) (e.g., based on RAM), Flash memory, phase-change memory (PCM), other types of memory, other optical disk storage, magnetic disk storage or other magnetic storage devices, or any other medium which can be used to store desired program code means in the form of computer-executable instructions or data structures and which can be accessed by a general-purpose or special-purpose computer.

The steps and/or actions of the methods described herein may be interchanged with one another without departing from the scope of the claims. In other words, unless a specific order of steps or actions is required for the proper operation of the method that is being described, the order and/or use of specific steps and/or actions may be modified without departing from the scope of the claims.

The term "determining" encompasses a wide variety of actions and, therefore, "determining" can include calculating, computing, processing, deriving, investigating, looking up (e.g., looking up in a table, a data repository, or another data structure), ascertaining, and the like. Also, "determining" can include receiving (e.g., receiving information), accessing (e.g., accessing data in a memory), and the like. Also, "determining" can include resolving, selecting, choosing, establishing, and the like.

The terms "comprising," "including," and "having" are intended to be inclusive and mean that there may be additional elements other than the listed elements. Additionally, it should be understood that references to "one implementation" or "implementations" of the present disclosure are not intended to be interpreted as excluding the existence of additional implementations that also incorporate the recited features. For example, any element or feature described concerning an implementation herein may be combinable with any element or feature of any other implementation described herein, where compatible.

The present disclosure may be embodied in other specific forms without departing from its spirit or characteristics. The described implementations are to be considered illustrative and not restrictive. The scope of the disclosure is indicated by the appended claims rather than by the foregoing description. Changes that come within the meaning and range of equivalency of the claims are to be embraced within their scope.

What is claimed is:

1. A computer-implemented method comprising:
   identifying a given user profile of a given user identifier that is generated by a profile generation model based on browsing activity;
   providing the given user profile to a sensitivity detection machine-learning model trained to classify users into sensitivity classifications based on user profiles;
   determining, by the sensitivity detection machine-learning model, that the given user profile is classified as a particular sensitivity classification; and
   providing, based on the particular sensitivity classification of the given user identifier, an indication to the profile generation model that causes the profile generation model to modify one or more model features of the profile generation model to disassociate the given user profile from the particular sensitivity classification, wherein modifying the one or more model features of the profile generation model causes the profile generation model to process a same or similar version of the browsing activity utilizing a second set of model features to determine a second subset of descriptive labels for the given user profile.

2. The computer-implemented method of claim 1, wherein identifying the given user profile comprises:
   providing the browsing activity associated with the given user identifier to the profile generation model; and
   receiving the given user profile comprising a first subset of descriptive labels for the given user profile from a set of descriptive labels.

3. The computer-implemented method of claim 1, wherein the particular sensitivity classification corresponds to privately safeguarded user information.

4. The computer-implemented method of claim 1, wherein the second subset of descriptive labels does not reveal the particular sensitivity classification within the given user profile.

5. The computer-implemented method of claim 1, wherein:
the sensitivity detection machine-learning model is a decision-tree model that provides a decision path for classifying the given user profile to the particular sensitivity classification;
the decision path indicates a combination of descriptive labels identified for the given user profile that resulted in the particular sensitivity classification; and
the indication indicates that the combination of descriptive labels resulted in the given user profile being classified to the particular sensitivity classification.

6. The computer-implemented method of claim 1, further comprising supplementing, based on the particular sensitivity classification of the given user identifier, the browsing activity of the given user identifier with artificial browsing activity not associated with the particular sensitivity classification.

7. The computer-implemented method of claim 1, further comprising generating a set of training data that simulates the browsing activity of users associated with a plurality of sensitivity classifications.

8. The computer-implemented method of claim 7, further comprising generating an additional set of training data that simulates additional browsing activity of control users not associated with the plurality of sensitivity classifications.

9. The computer-implemented method of claim 7, wherein generating the set of training data that simulates the browsing activity of the users associated with the plurality of sensitivity classifications comprises generating, over a period of months, simulated users that visit a random amount of websites associated with one or more sensitivity classifications in addition to visiting additional websites not associated with the one or more sensitivity classifications.

10. The computer-implemented method of claim 9, further comprising generating the sensitivity detection machine-learning model by tuning the sensitivity detection machine-learning model to classify a user profile of a simulated user that visited over a threshold amount of websites associated with the particular sensitivity classification to the one or more sensitivity classifications.

11. A system comprising:
a given user profile of a given user identifier generated by a profile generation model that generates user profiles for user identifiers comprising one or more descriptive labels for each of the user identifiers;
a sensitivity detection machine-learning model trained to classify users into sensitivity classifications based on the user profiles;
at least one processor at a server device; and
a computer memory comprising instructions that, when executed by the at least one processor at the server device, cause the system to carry out operations comprising:
providing the given user profile to the sensitivity detection machine-learning model to determine that the given user profile is classified as a particular sensitivity classification; and
providing, based on the particular sensitivity classification of the given user identifier, an indication to the profile generation model that causes the profile generation model to be modified such that when processing browser activity of the given user identifier, the profile generation model disassociates the given user profile from the particular sensitivity classification, wherein modifying the profile generation model causes the profile generation model to process a same or similar version of user browsing activity utilizing a second set of model features to determine a second subset of descriptive labels for the given user profile.

12. The system of claim 11, further comprising instructions that, when executed by the at least one processor, cause the system to carry out an operation comprising supplementing, based on the particular sensitivity classification of the given user identifier, browsing activity of the given user identifier with artificial browsing activity not associated with the particular sensitivity classification.

13. The system of claim 11, wherein the indication causes the profile generation model to disassociate the given user profile from the particular sensitivity classification by causing the profile generation model to determine different descriptive labels for the given user profile that was previously determined.

14. The system of claim 11, further comprising instructions that, when executed by the at least one processor, cause the system to carry out an operation comprising providing a visual indication to a client device associated with a given user that the given user profile has been determined to be associated with the particular sensitivity classification.

15. The system of claim 14, further comprising instructions that, when executed by the at least one processor, cause the system to carry out operations comprising:
identifying a potential interaction with an online resource by the given user;
determining how adding the online resource changes the given user profile of the given user identifier; and
providing, when the potential interaction changes a classification status of a sensitivity classification, an additional indication to a client device associated with the given user identifier that performing the potential interaction with the online resource will change the classification status of the sensitivity classification.

16. The system of claim 11, further comprising instructions that, wherein the sensitivity detection machine-learning model is a decision-tree model that provides a decision path for classifying the given user profile to the particular sensitivity classification.

17. A computer-implemented method comprising:
identifying a given user profile generated by a profile generation model based on browsing activity associated with a given user identifier;
providing the given user profile to a sensitivity detection machine-learning model trained to classify users into sensitivity classifications based on user profiles;
determining, by the sensitivity detection machine-learning model, that the given user profile is classified as a particular sensitivity classification; and
providing, based on the particular sensitivity classification, the profile generation model with an indication that the given user profile is classified as the particular sensitivity classification that causes the profile generation model to modify one or more model rules of the profile generation model to disassociate the given user profile from the particular sensitivity classification, wherein modifying the profile generation model causes the profile generation model to process a same or similar version of the browsing activity utilizing a second set of model features to determine a second subset of descriptive labels for the given user profile.

18. The computer-implemented method of claim 17, wherein the particular sensitivity classification corresponds to privately safeguarded user information.

19. The computer-implemented method of claim 17, further comprising:
   generating a set of training data that simulates the browsing activity of users associated with a plurality of sensitivity classifications; and
   generating additional training data that simulates additional browsing activity of control users not associated with the plurality of sensitivity classifications.

20. The computer-implemented method of claim 19, wherein generating the set of training data that simulates the browsing activity of the users associated with the plurality of sensitivity classifications comprises generating, over a period of months, simulated users that browse a random amount of websites associated with one or more sensitivity classifications in addition to browsing additional websites not associated with the one or more sensitivity classifications.

\* \* \* \* \*